(12) United States Patent
Forshew et al.

(10) Patent No.: US 12,509,733 B1
(45) Date of Patent: Dec. 30, 2025

(54) METHODS AND SYSTEMS FOR DETECTING A PRIMARY DISEASE

(71) Applicant: Inivata Ltd., Cambridge (GB)

(72) Inventors: Tim Forshew, Hitchin (GB); Giovanni Marsico, Cambridge (GB)

(73) Assignee: Inivata Ltd., Cambridge (GB)

( * ) Notice: Subject to any disclaimer, the term of this patent is extended or adjusted under 35 U.S.C. 154(b) by 0 days.

(21) Appl. No.: 19/181,901

(22) Filed: Apr. 17, 2025

Related U.S. Application Data

(60) Provisional application No. 63/784,588, filed on Apr. 7, 2025.

(51) Int. Cl.
*C12Q 1/6886* (2018.01)

(52) U.S. Cl.
CPC ..... *C12Q 1/6886* (2013.01); *C12Q 2600/154* (2013.01); *C12Q 2600/156* (2013.01)

(58) Field of Classification Search
None
See application file for complete search history.

(56) References Cited

U.S. PATENT DOCUMENTS

| | | | |
|---|---|---|---|
| 5,948,902 | A | 9/1999 | Honkanen et al. |
| 11,519,019 | B2 | 12/2022 | Kennedy et al. |
| 11,952,616 | B2 | 4/2024 | Kennedy et al. |
| 12,312,634 | B2 | 5/2025 | Kennedy |
| 12,359,245 | B2 | 7/2025 | Kennedy et al. |
| 2019/0390253 | A1 | 12/2019 | Kennedy et al. |
| 2021/0355485 | A1 | 11/2021 | Lin et al. |
| 2023/0193380 | A1 | 6/2023 | Lin et al. |
| 2023/0332206 | A1 | 10/2023 | Kennedy et al. |
| 2024/0026453 | A1 | 1/2024 | Frumkin et al. |
| 2024/0279714 | A1 | 8/2024 | Kennedy et al. |
| 2024/0287601 | A1 | 8/2024 | Lin et al. |
| 2024/0409979 | A1 | 12/2024 | Kennedy et al. |
| 2024/0409980 | A1 | 12/2024 | Kennedy et al. |
| 2025/0051840 | A1 | 2/2025 | Wang et al. |
| 2025/0154558 | A1 | 5/2025 | Kennedy |
| 2025/0171826 | A1 | 5/2025 | Kennedy |

FOREIGN PATENT DOCUMENTS

| | | | |
|---|---|---|---|
| AU | 2021384324 | A9 | 6/2024 |
| AU | 2017382439 | B2 | 8/2024 |
| BR | 112019012958 | A2 | 11/2019 |
| CN | 110325650 | A | 10/2019 |
| CN | 116848262 | A | 10/2023 |
| CN | 118541493 | A | 8/2024 |
| EP | 3559270 | A2 | 10/2019 |
| EP | 4247973 | A1 | 9/2023 |
| EP | 4457357 | A2 | 11/2024 |
| IL | 302912 | A | 7/2023 |
| IL | 302988 | A | 7/2023 |
| JP | 2020504606 | A | 2/2020 |
| JP | 7300989 | B2 | 6/2023 |
| JP | 2023089062 | A | 6/2023 |
| JP | 2023550141 | A | 11/2023 |
| JP | 2024147684 | A | 10/2024 |
| JP | 2025502811 | A | 1/2025 |
| KR | 20190095410 | A | 8/2019 |
| KR | 20230109693 | A | 7/2023 |
| KR | 102723226 | B1 | 10/2024 |
| KR | 20240158369 | A | 11/2024 |
| MX | 2019007444 | A | 8/2019 |
| WO | WO-2018119452 | A2 | 6/2018 |
| WO | WO-2018119452 | A3 | 8/2018 |
| WO | WO-2022107145 | A1 | 5/2022 |
| WO | WO-2023129965 | A2 | 7/2023 |
| WO | WO-2023129965 | A3 | 10/2023 |

OTHER PUBLICATIONS

Tivey et al. Cell Reports Medicine. 5, 101736, p. 1-16 (Year: 2024).*
Christiano et al Nature. 570: 385, 20 pages (Year: 2019).*
Ren et al Cancer Medicine. 13:e70511, p. 1-9 (Year: 2024).*
Chan et al Cancer Research. 83(7_Supplement), Abstract 6694 (Year: 2023).*
Meng et al (J Mol. Diagnos. 23(9), 1174-1184 (Year: 2021).*
Bie, Fenglong et al. Multimodal analysis of cell-free DNA whole-methylome sequencing for cancer detection and localization. Nature Communications 14(6042):1-13 (2023).

* cited by examiner

*Primary Examiner* — Carla J Myers
(74) *Attorney, Agent, or Firm* — Wilson Sonsini Goodrich & Rosati

(57) ABSTRACT

Methods and systems disclosed herein relate to detecting a presence or an absence of a second primary disease in a subject. The methods may comprise performing a workflow comprising a minimal residual disease (MRD) assay on a biological sample and using a result of the workflow to detect a presence or absence of a second primary disease in the subject.

30 Claims, 4 Drawing Sheets

METHODS AND SYSTEMS FOR DETECTING A PRIMARY DISEASE

CROSS-REFERENCE

This application claims the benefit of U.S. Provisional Application No. 63/784,588, filed Apr. 7, 2025, which is incorporated herein by reference in its entirety.

BACKGROUND

The present disclosure relates generally to detection of a primary disease in a subject. More particularly, the present disclosure relates to detection of a second primary disease in a subject that has been previously diagnosed with a first primary disease and performing a minimal residual disease (MRD) assay of a biological sample of the subject.

SUMMARY

Aspects disclosed herein provide methods for detecting a presence or an absence of a second primary disease in a subject, the method comprising: (a) performing a workflow comprising a first assay and a second assay on a biological sample obtained or derived from the subject, wherein the first assay comprises a minimum residual disease (MRD) assay, wherein the subject has been previously diagnosed with a first primary disease; and (b) using a result of the workflow to detect the presence or the absence of the second primary disease in the subject.

In some embodiments, the first assay comprises a genetic assay, and wherein the second assay comprises an epigenetic assay. In some embodiments, the first assay comprises a tumor-informed genetic assay. In some embodiments, the second assay comprises a tumor-naïve epigenetic assay. In some embodiments, the first assay or the second assay comprises a sequencing assay. In some embodiments, the first assay comprises a personalized sequencing assay, a digital signature assay, or a combination thereof. In some embodiments, the second assay comprises methylation sequencing. In some embodiments, the methylation sequencing comprises enzymatic methyl sequencing (EM-Seq), nanopore sequencing, bisulfite sequencing, or a methylation enrichment assay. In some embodiments, the second assay comprises a fragmentation assay. In some embodiments, the first assay and the second assay are performed in parallel.

In some embodiments, the workflow comprises performing a first analysis using a first signal of the first assay and performing a second analysis using a second signal of the second assay, wherein the first signal and the second signal are derived from different data, and wherein the different data are obtained from the first assay and the second assay. In some embodiments, the first assay comprises a personalized sequencing assay. In some embodiments, the first signal comprises a genetic variant signal. In some embodiments, the second assay comprises a methylation sequencing assay or a fragmentation assay.

In some embodiments, the workflow comprises performing a first analysis using a first signal of the first assay and performing a second analysis using a second signal of the second assay, and wherein the first signal and the second signal originate from different features or different measurements of the same data. In some embodiments, the same data comprises whole genome sequencing data. In some embodiments, the first assay and the second assay each comprises a digital signature assay. In some embodiments, the first signal comprises a genetic variant signal. In some embodiments, the genetic variant signal comprises a single nucleotide variant (SNV) signal. In some embodiments, the second signal comprises an epigenetic change signal. In some embodiments, the epigenetic change signal comprises a DNA methylation signal or a fragmentation signal. In some embodiments, the subject has not been diagnosed with the second primary disease. In some embodiments, the subject is asymptomatic of the second primary disease. In some embodiments, the subject is symptomatic of the second primary disease. In some embodiments, the first primary disease, or the second primary disease, or both, comprises cancer. In some embodiments, the presence of the second primary disease of the subject is detected with a sensitivity of at least 50%. In some embodiments, the absence of the second primary disease of the subject is detected with a specificity of at least 50%. In some embodiments, the biological sample comprises a blood sample, a plasma sample, or a serum sample. In some embodiments, the biological sample comprises cell-free deoxyribonucleic acid (cfDNA), cell-free ribonucleic acid (cfRNA), circulating tumor cells (CTCs), or a combination thereof.

In some embodiments, a time between a suspicion of the second primary disease and a diagnosis of the second primary disease is reduced by at least 10% relative to a method comprising additional testing, additional imaging, or a combination thereof prior to the diagnosis of the second primary disease.

Aspects disclosed herein provide methods for detecting a presence or an absence of a second primary disease in a subject, the method comprising: (a) performing a workflow comprising a first assay and a second assay on a biological sample obtained or derived from the subject, wherein the first assay comprises a MRD assay, wherein the subject has been previously diagnosed with a first primary disease; and (b) using a result of the workflow to detect the presence or the absence of a second primary disease in the subject. In some embodiments, the first assay or the second assay comprises polymerase chain reaction (PCR), flow cytometry, a sequencing assay, a methylation assay, fluorescence in situ hybridization (FISH), immunohistochemistry, or mass spectrometry. In some embodiments, the first assay or the second assay comprises the polymerase chain reaction (PCR). In some embodiments, the PCR comprises real-time quantitative PCR (RT-qPCR), digital PCR (dPCR), droplet digital PCR (ddPCR), multiplex PCR, nested PCR, reverse transcription PCR (RT-PCR), or in situ PCR. In some embodiments, the first assay or the second assay comprises the flow cytometry. In some embodiments, the first assay or the second assay comprises the sequencing assay. In some embodiments, the sequencing assay comprises next generation sequencing (NGS). In some embodiments, the sequencing assay comprises deoxyribonucleic acid (DNA) sequencing, ribonucleic acid (RNA) sequencing, or pyrosequencing. In some embodiments, the first assay or the second assay comprises the FISH. In some embodiments, the first assay or the second assay comprises the immunohistochemistry. In some embodiments, the first assay or the second assay comprises the methylation assay. In some embodiments, the methylation assay comprises enzymatic methyl sequencing (EM-Seq), nanopore sequencing, bisulfite sequencing, or a methylation enrichment assay. In some embodiments, the first assay or the second assay comprises the mass spectrometry. In some embodiments, the first assay or the second assay comprises DNase I hypersensitive sites sequencing (DNase-seq), Formaldehyde-assisted isolation of regulatory elements sequencing (FAIRE-seq), assay for transposase-accessible chromatin sequencing (ATAC-seq), or a combination thereof. In some embodiments, the biological sample comprises a blood sample, a plasma sample, a serum sample, a urine sample, a saliva sample, a cerebrospinal fluid sample, a stool sample, a lymph node sample, or a bone marrow sample. In some embodiments, the first assay or the second assay comprises a tumor informed assay, a tumor naïve assay, or a combination thereof. In some embodiments, the first assay or the second assay comprises the tumor informed assay. In some embodiments, the first assay or the second assay comprises the tumor naïve assay. In some embodiments, the first assay or the second assay comprises the tumor informed assay and the tumor naïve assay. In some embodiments, the first assay or the second assay comprises a genetic assessment assay, an epigenetic assessment assay, or a combination thereof. In some embodiments, the first assay or the second assay comprises the genetic assessment assay. In some embodiments, the first assay or the second assay comprises the epigenetic assessment assay. In some embodiments, the first assay or the second assay comprises the genetic assessment assay and the epigenetic assessment assay. In some embodiments, one or more results of the first assay or the second assay informs a presence or absence of the first primary disease and a presence or absence of the second primary disease. In some embodiments, the method comprises one or more workflows. In some embodiments, the workflows comprise a first assay and a second assay. In some embodiments, the first assay and the second assay are different assays, wherein the first assay is an MRD assay. In some embodiments, the first assay is a tumor informed assay and the second assay is a tumor naïve assay. In some embodiments, the first assay is a tumor naïve assay and the second assay is a tumor informed assay. In some embodiments, the first assay and the second assay are the same assay. In some embodiments, the first assay and the second assay are tumor informed assays. In some embodiments, the first assay and the second assay are tumor naïve assays. In some embodiments, the method further comprises performing a first analysis on a result of the first assay and performing a second analysis on a result of the second assay. In some embodiments, the first analysis and the second analysis are different. In some embodiments, the first analysis comprises tumor-informed data and the second analysis comprises tumor-naïve data. In some embodiments, the tumor naïve data comprises fragmentomics data, mutational profile data, epigenetics data, or a combination thereof. In some embodiments, the tumor naïve data comprises at least two of the fragmentomics data, the mutational profile data, and the epigenetics data. In some embodiments, the tumor naïve data comprises the fragmentomics data, the mutational profile data, and the epigenetics data. In some embodiments, the first analysis is performed to assess if the first primary disease is present in the subject and the second analysis is performed to assess if the second primary disease is present in the subject. In some embodiments, the first analysis and the second analysis are performed on the same data. In some embodiments, the first analysis and the second analysis are performed on different features or measurements of the same data. In some embodiments, the first assay is performed at a first time point and the second assay is performed at a second time point. In some embodiments, the first time point is before the second time point. In some embodiments, the first time point is after the second time point. In some embodiments, the first assay and the second assay are performed at the same time point. In some embodiments, the first assay and the second assay are performed on the biological sample. In some embodiments, the first assay detects the first primary disease and the second assay detects the second primary disease. In some embodiments, the first assay detects one or more additional diseases. In some embodiments, the first assay comprises a personalized sequencing assay, a digital signature assay, or a combination thereof. In some embodiments, the personalized sequencing assay targets a plurality of genetic changes, a plurality of epigenetic changes, or a combination thereof, that has been previously identified in a sample of the first primary disease. In some embodiments, the digital signature assay targets a plurality of genetic changes, a plurality of epigenetic changes, or a combination thereof, that has been previously identified in a sample of the first primary disease. In some embodiments, the second assay comprises a methylation assay, a fragmentation assay, a protein detection assay, or a combination thereof. In some embodiments, the methylation assay comprises bisulfite sequencing, enzymatic methyl sequencing (EM-Seq), nanopore sequencing, or a methylation enrichment assay. In some embodiments, the methylation assay comprises the bisulfite sequencing. In some embodiments, the methylation assay comprises the EM-Seq. In some embodiments, the methylation assay comprises the nanopore sequencing. In some embodiments, the methylation assay comprises the methylation enrichment assay. In some embodiments, the biological sample is a cell-free biological sample. In some embodiments, the cell-free biological sample comprises the plasma sample. In some embodiments, the cell-free biological sample comprises the serum sample. In some embodiments, the cell-free biological sample comprises the urine sample. In some embodiments, the cell-free biological sample comprises cell-free deoxyribonucleic acid (cfDNA), cell-free ribonucleic acid (cfRNA), or a combination thereof. In some embodiments, the cell-free biological sample comprises the cfDNA. In some embodiments, the cell-free biological sample comprises the cfRNA. In some embodiments, the cell-free biological sample comprises circulating tumor cells (CTCs). In some embodiments, the biological sample comprises nucleic acids. In some embodiments, the nucleic acids comprise deoxyribonucleic acid (DNA), ribonucleic acid (RNA), or a combination thereof. In some embodiments, the nucleic acids comprise the DNA. In some embodiments, the DNA comprises single-stranded DNA (ssDNA), double-stranded DNA (dsDNA), or a combination thereof. In some embodiments, the nucleic acids comprise the RNA. In some embodiments, the biological sample is obtained by a biopsy. In some embodiments, the biopsy comprises a fine needle aspiration (FNA), a core needle biopsy, or a stereotactic biopsy. In some embodiments, the subject is suspected of having the first primary disease. In some embodiments, the subject is not suspected of having the first primary disease. In some embodiments, the subject comprises one or more symptoms of the first primary disease. In some embodiments, the subject is asymptomatic of the first primary disease. In some embodiments, the subject is suspected of having the second primary disease. In some embodiments, the subject is not suspected of having the second primary disease. In some embodiments, the subject comprises one or more symptoms of the second primary disease. In some embodiments, the subject is asymptomatic of the second primary disease. In some embodiments, the subject has received a diagnosis of the second primary disease. In some embodiments, the subject has not received a diagnosis of the second primary disease. In some embodiments, the subject is human. In some embodiments, the first primary disease, the second primary disease, or a combination thereof, comprises cancer. In some embodiments, the cancer comprises adrenal gland cancer, kidney cancer, aerodigestive tract cancer, biliary tract cancer, breast cancer, liver cancer, ovarian cancer, lung cancer, leukemia, lymphoma, salivary gland cancer, renal cancer, bladder cancer, brain cancer, head and neck cancer, prostate cancer, skin cancer, pancreatic cancer, cervical cancer, colorectal cancer, testicular cancer, thyroid cancer, bile duct cancer, central nervous system cancer, or esophageal cancer. In some embodiments, the cancer comprises stage 0 cancer, stage I cancer, stage II cancer, stage III cancer, or stage IV cancer. In some embodiments, the first primary disease, the second primary disease, or a combination thereof, comprises a hematologic disease, acute lymphoblastic leukemia (ALL), acute myeloid leukemia (AML), acute promyelocytic leukemia (APL), anaplastic large cell lymphoma (ALCL), Burkitt lymphoma, chronic lymphocytic leukemia (CLL), chronic myeloid leukemia (CML), diffuse large B-cell lymphoma (DLBCL), eosinophilia, follicular lymphoma, hairy cell leukemia (HCL), Hodgkin lymphoma, large granular lymphocytic leukemia (LGL), MALT lymphoma, mantle cell lymphoma (MCL), marginal zone B-cell lymphoma (MZL), Mastocytosis, myelodysplastic syndrome (MDS), myeloproliferative neoplasm (MPN), non-Hodgkin lymphoma (NHL), plasma cell myeloma, PNH, t-cell lymphoma, or Waldenstrom macroglobulinemia. In some embodiments, the second primary disease of the subject is detected with an accuracy of at least 50%, 55%, 60%, 65%, 70%, 75%, 80%, 85%, 90%, 95%, 96%, 97%, 98%, or 99%. In some embodiments, the second primary disease of the subject is detected with a sensitivity of at least 50%, 55%, 60%, 65%, 70%, 75%, 80%, 85%, 90%, 95%, 96%, 97%, 98%, or 99%. In some embodiments, the second primary disease of the subject is detected with a specificity of at least 50%, 55%, 60%, 65%, 70%, 75%, 80%, 85%, 90%, 95%, 96%, 97%, 98%, or 99%. In some embodiments, the second primary disease of the subject is detected with a positive predictive value (PPV) of at least 50%, 55%, 60%, 65%, 70%, 75%, 80%, 85%, 90%, 95%, 96%, 97%, 98%, or 99%. In some embodiments, the second primary disease of the subject is detected with a negative predictive value (NPV) of at least 50%, 55%, 60%, 65%, 70%, 75%, 80%, 85%, 90%, 95%, 96%, 97%, 98%, or 99%. In some embodiments, the second primary disease of the subject is detected with an Area Under the Curve (AUC) of a Receiver Operating Characteristic (ROC) of at least 0.50, 0.55, 0.60, 0.65, 0.70, 0.75, 0.80, 0.85, 0.90, 0.95, 0.96, 0.97, 0.98, or 0.99. In some embodiments, the second primary disease is the first primary disease. In some embodiments, the second primary disease is different from the first primary disease. In some embodiments, the second primary disease is a derivative of the first primary disease. In some embodiments, the first primary disease comprises a first tumor and the second primary disease comprises a second tumor. In some embodiments, the first tumor and the second tumor are the same. In some embodiments, the first tumor and the second tumor are different. In some embodiments, the first tumor comprises a benign tumor and the second tumor comprises a metastasized tumor. In some embodiments, the method further comprises, using the result of the second assay, detecting a presence or an absence of the second primary disease or one or more additional diseases. In some embodiments, the one or more additional diseases comprise at least 15 additional diseases, at least 20 additional diseases, at least 25 additional diseases, at least 30 additional diseases, at least 35 additional diseases, at least 40 additional diseases, at least 45 additional diseases, at least 50 additional diseases, at least 55 additional diseases, or at least 60 additional diseases. In some embodiments, each of the one or more additional diseases are different from each other. In some embodiments, the one or more additional diseases is detected with an accuracy of at least 50%, 55%, 60%, 65%, 70%, 75%, 80%, 85%, 90%, 95%, 96%, 97%, 98%, or 99%. In some embodiments, the one or more additional diseases is detected with a sensitivity of at least 50%, 55%, 60%, 65%, 70%, 75%, 80%, 85%, 90%, 95%, 96%, 97%, 98%, or 99%. In some embodiments, the one or more additional diseases is detected with a specificity of at least 50%, 55%, 60%, 65%, 70%, 75%, 80%, 85%, 90%, 95%, 96%, 97%, 98%, or 99%. In some embodiments, the one or more additional diseases is detected with a positive predictive value (PPV) of at least 50%, 55%, 60%, 65%, 70%, 75%, 80%, 85%, 90%, 95%, 96%, 97%, 98%, or 99%. In some embodiments, the one or more additional diseases is detected with a negative predictive value (NPV) of at least 50%, 55%, 60%, 65%, 70%, 75%, 80%, 85%, 90%, 95%, 96%, 97%, 98%, or 99%. In some embodiments, the one or more additional diseases is detected with an Area Under the Curve (AUC) of a Receiver Operating Characteristic (ROC) of at least 0.50, 0.55, 0.60, 0.65, 0.70, 0.75, 0.80, 0.85, 0.90, 0.95, 0.96, 0.97, 0.98, or 0.99. In some embodiments, the method further comprises processing the result of the first assay or the second assay against a reference value. In some embodiments, the method further comprises processing the result of the first assay or the second assay using a trained machine learning classifier or a trained regression method. In some embodiments, the trained machine learning classifier is selected from the group consisting of a deep learning classifier, a neural network classifier, a linear discriminant analysis (LDA) classifier, a random forest (RF) classifier, a naive Bayes algorithm classifier, a decision tree, a gradient boosting classifier, a support vector machine, a genetic algorithm, an individual component analysis (ICA), a singular value decomposition (SVD), a factor analysis classifier, and a principal component analysis (PCA) classifier. In some embodiments, the method further comprises quantifying sequence reads of the result of the first assay or the second assay at a plurality of genomic loci. In some embodiments, the method further comprises determining a first signal in the first assay. In some embodiments, the method further comprises determining a second signal in the second assay. In some embodiments, the method further comprises determining a first signal in the first assay and a second signal in the second assay. In some embodiments, the method further comprises comparing the first signal in the first assay and the second signal in the second assay. In some embodiments, the method further comprises determining, based on the comparing, a likelihood of a presence or an absence of the first primary disease, the second primary disease, an additional primary disease, or a combination thereof, in the subject. In some embodiments, the method further comprises determining a second signal in the second assay and not identifying a first signal in the first assay. In some embodiments, the method further comprises determining that the subject comprises the second primary disease and not the first primary disease. In some embodiments, the first signal comprises DNA methylation or fragmentation. In some embodiments, the second signal comprises DNA methylation or fragmentation. In some embodiments, the second assay comprises an epigenetic assay, and wherein the epigenetic assay is performed on the biological sample of the subject and on an additional sample of the first primary disease, wherein results from the epigenetic assay performed on the biological sample of the subject and on the additional sample are used to determine a likelihood that the subject comprises the second primary disease and not the first primary disease. In some embodiments, the method further comprises administering a treatment to the subject. In some embodiments, the treatment is for treating the first primary disease, the second primary disease, or a combination thereof. In some embodiments, the treatment is for treating the first primary disease. In some embodiments, the treatment is for treating the second primary disease. In some embodiments, the treatment is for treating the first primary disease and the second primary disease. In some embodiments, the treatment comprises chemotherapy, radiation therapy, surgical resection, targeted therapy, immunotherapy, or a combination thereof. In some embodiments, the method further comprises monitoring the subject for the second primary disease.

Aspects disclosed herein provide systems comprising one or more processors and a memory operatively coupled to the one or more processors, wherein the one or more processors are individually or collectively programmed to perform any one of the methods disclosed herein.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The features of the invention are set forth with particularity in the appended claims. A better understanding of the features and advantages of the present methods and systems will be obtained by reference to the following detailed description that sets forth illustrative examples, in which the principles of the methods and systems are utilized, and the accompanying drawings (also "figure" and "FIG." herein), of which:

DETAILED DESCRIPTION

Figure 1:
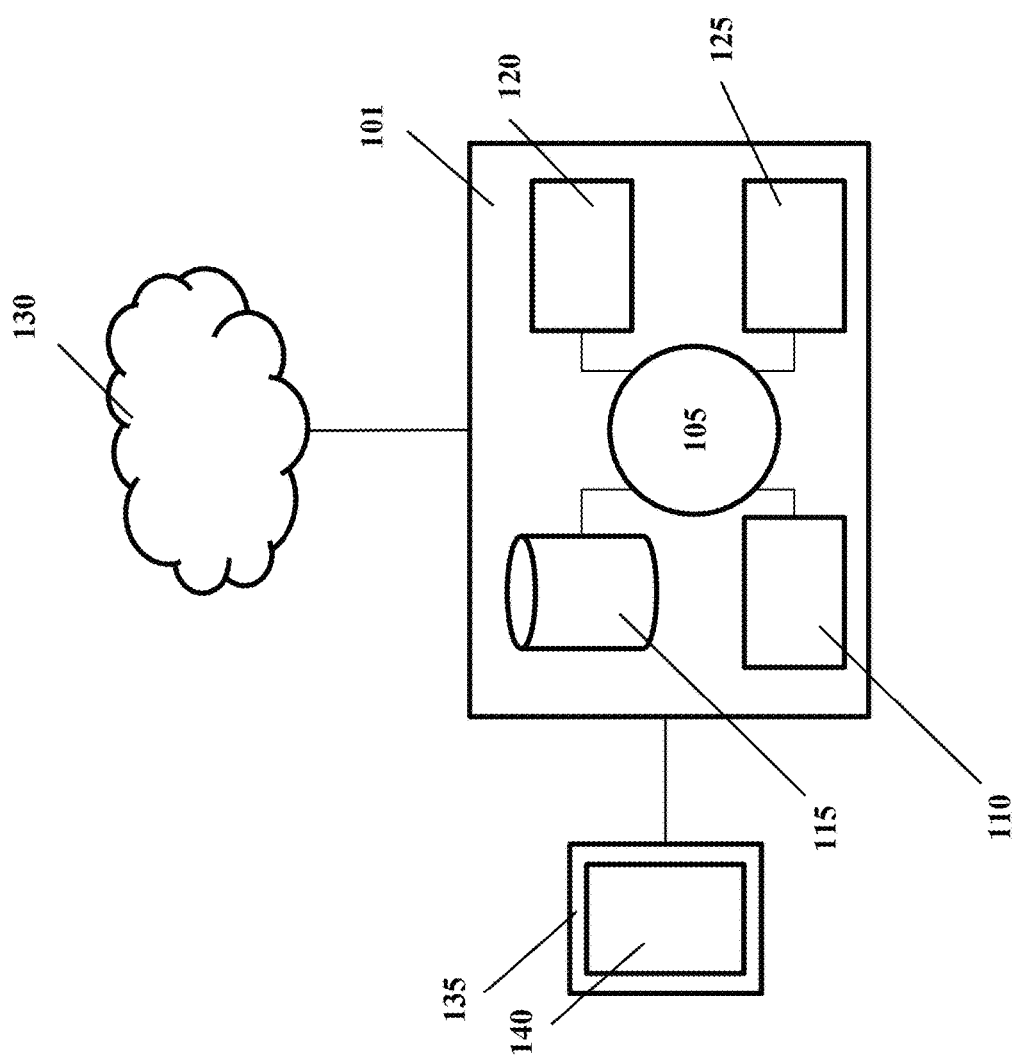
FIG. 1 shows an example of a computer system that is programmed or otherwise configured to implement methods provided herein.

While various embodiments of the inventive concepts have been shown and disclosed herein, it will be obvious to those skilled in the art that such embodiments are provided by way of example only. Numerous variations, changes, and substitutions may occur to those skilled in the art without departing from the inventive concepts. It should be understood that various alternatives to the embodiments of the inventive concepts disclosed herein may be employed.

Throughout this application, various embodiments may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Definitions

The terms "substantially" or "substantial", as used herein, generally refer to a range of numerical values (e.g., values within 5-10% of the specified value). For example, "substantially" can include values greater than or equal to 90% of a specified value. Substantially does not require 100%.

As used herein, the singular forms of the terms "a", "an" and "the", as used herein, generally include plural references unless the context clearly dictates otherwise. For example, the term "a sample" includes a plurality of samples, including mixtures thereof.

In this application, the use of the term "or", as used herein, generally indicates "and/or" unless stated otherwise. The terms "and/or" and "any combination thereof" and their grammatical equivalents as used herein, can be used interchangeably. These terms can convey that any combination is specifically contemplated. Solely for illustrative purposes, the following phrases "A, B, and/or C" or "A, B, C, or any combination thereof" or "A, B, C, or a combination thereof" can mean "A individually; B individually; C individually; A and B; B and C; A and C; and A, B, and C." The term "or" can be used conjunctively or disjunctively, unless the context specifically refers to a disjunctive use.

The terms "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain"), as used herein, are generally inclusive or open-ended and do not exclude additional, unrecited elements or method operations. It is contemplated that any embodiment discussed in this specification can be implemented with respect to any method or composition of the present disclosure, and vice versa. Furthermore, compositions of the present disclosure can be used to achieve methods of the present disclosure.

Reference in the specification to "some embodiments," "an embodiment," "one embodiment", or "other embodiments" as used herein generally indicates that a particular feature, structure, or characteristic described in connection with the embodiments is included in at least some embodiments, but not necessarily all embodiments, of the present disclosures.

The terms "determining", "assessing", "assaying," and "analyzing" are often used interchangeably herein and generally refer to forms of measurement. The terms can include determining if an element is present or not (for example, detection). These terms can include quantitative, qualitative, or quantitative and qualitative determinations. Assessing can be relative or absolute. "Detecting the presence of" can include determining the amount of something present in addition to determining whether it is present or absent depending on the context.

The term "cancer", as used herein, generally refers to any disease characterized by uncontrolled cell division. A cancer can be a cancer of the blood (i.e., hematological cancer), e.g., leukemia, lymphoma, or multiple myeloma, or a cancer can be neoplastic, e.g., associated with an abnormal mass of tissue in which cells grow and divide more than they should or do not die when they should. Neoplastic cancers, e.g., lung, breast or liver cancer, are associated with a solid tumor.

The terms "cell-free DNA," "cfDNA molecules," or simply "cfDNA", as used herein, generally refer to DNA molecules that naturally occur in a subject in extracellular form (e.g., in blood, serum, plasma, or other bodily fluids such as lymph, cerebrospinal fluid, urine, or sputum). While the cfDNA previously existed in a cell or cells in a large complex biological organism, e.g., a mammal, it has undergone release from the cell(s) into a fluid found in the organism, and may be obtained from a sample of the fluid without the need to perform an in vitro cell lysis step. cfDNA molecules may occur as DNA fragments.

The term "circulating tumor DNA" or "ctDNA", as used herein, generally refer to DNA that originates directly from a tumor or from circulating tumor cells (CTCs), which are viable, intact tumor cells that shed from primary tumors and can enter the bloodstream or lymphatic system. The precise mechanism of how ctDNA is released is unclear, although it is postulated to involve apoptosis and necrosis from dying cells, or active release from viable tumor cells. Circulating tumor DNA (ctDNA) can be highly fragmented and in some cases can have a mean fragment size about 100-250 bp, e.g., 150 to 200 bp long. The amount of ctDNA in a sample of circulating cell-free DNA isolated from a cancer patient varies greatly: samples may contain less than 10% ctDNA, although many samples from patients being assessed for MRD may have less than 0.01% ctDNA and some samples have over 10% ctDNA. Molecules of ctDNA can be often identified because they contain tumorigenic mutations.

The term "methylation" or "DNA methylation", as used herein, generally refers to addition of a methyl group to a nucleobase in a nucleic acid molecule. In some embodiments, methylation refers to addition of a methyl group to a cytosine at a CpG site (cytosine-phosphate-guanine site (i.e., a cytosine followed by a guanine in a 5→3' direction of the nucleic acid sequence)). In some embodiments, DNA methylation refers to addition of a methyl group to adenine, such as in N6-methyladenine. In some embodiments, DNA methylation is 5-methylation (modification of the $5^{th}$ carbon of the 6-carbon ring of cytosine). Methylation can also occur at non CpG sites, for example, methylation can occur at a CpA, CpT, or CpC site. DNA methylation can change the activity of methylated DNA region. For example, when DNA in a promoter region is methylated, transcription of the gene may be repressed. DNA methylation is critical for normal development and abnormality in methylation may disrupt epigenetic regulation. The disruption, e.g., repression, in epigenetic regulation may cause diseases, such as cancer. Promoter methylation in DNA may be indicative of cancer.

The terms "minimum residual disease," "minimal residual disease", "measurable residual disease," "molecular residual disease," "MRD" or simply "residual disease", as used herein, generally refers to the presence of a small number of cancer cells in the body during or after treatment of the disease.

The terms "neoplasm" and "tumor", as used herein, are used interchangeably. They refer to abnormal growth of cells in a subject. A neoplasm or tumor can be benign, potentially malignant, or malignant. A malignant tumor is referred to as a cancer or a cancerous tumor.

The term "metastasized tumor", as used herein, generally refers to a genetically distinct tumor originating from a first tumor. Metastasized tumors may occur from the spread of a cancer to other part(s) of the body. A metastasized tumor may be the same cancer type as the primary tumor but is genetically distinct from the primary tumor.

The terms "nucleic acid" and "polynucleotide", as used herein, are used interchangeably herein to describe a polymer of any length, e.g., greater than about 2 bases, greater than about 10 bases, greater than about 100 bases, greater than about 500 bases, greater than about 1,000 bases, greater than about 10,000 bases, greater than about 100,000 bases, greater than about 1,000,000, up to about 1,010 or more bases composed of nucleotides, e.g., deoxyribonucleotides or ribonucleotides, and may be produced enzymatically or synthetically (e.g., PNA as described in U.S. Pat. No. 5,948,902 and the references cited therein) which can hybridize with naturally occurring nucleic acids in a sequence specific manner analogous to that of two naturally occurring nucleic acids, e.g., can participate in Watson-Crick base pairing interactions. Naturally occurring nucleotides include guanine, cytosine, adenine, thymine, uracil (G, C, A, T and U respectively). DNA and RNA have a deoxyribose and ribose sugar backbone, respectively, whereas PNA's backbone is composed of repeating N-(2-aminoethyl)-glycine units linked by peptide bonds. In PNA various purine and pyrimidine bases are linked to the backbone by methylenecarbonyl bonds. A locked nucleic acid (LNA), often referred to as inaccessible RNA, is a modified RNA nucleotide. The ribose moiety of an LNA nucleotide is modified with an extra bridge connecting the 2' oxygen and 4' carbon. The bridge "locks" the ribose in 3'-endo (North) conformation, which is often found in the A-form duplexes. LNA nucleotides can be mixed with DNA or RNA residues in the oligonucleotide whenever desired.

The term "primary disease", as used herein, generally refers to a first instance of a disease. A subject may suffer from one or more primary diseases. In some embodiments, a patient has a first primary disease and a second primary disease. In some embodiments, a patient has a first primary disease, a second primary disease, and one or more additional primary diseases. In some embodiments, the primary disease(s) is cancer. In some embodiments, the primary disease is a tumor.

The term "first primary disease," as used herein, generally refers to a first instance of a disease. In some embodiments, an individual has previously been diagnosed with and/or received treatment for the first primary disease. A first primary disease may be a recurrence of a first primary disease or it may be residual first primary disease (e.g., after treatment).

The term "second primary disease," as used herein, generally refers to a first instance of a disease, which is genetically distinct from the first primary disease, and that develops in an individual who has previously been diagnosed and/or treated for a first primary disease.

The term "sample" or a "biological sample", as used herein, generally refers to anything capable of being analyzed by the methods or systems disclosed herein. A sample may be derived from a subject.

The term "sequencing", as used herein, generally refers to any of a number of technologies used to determine the sequence (e.g., the identity and order of monomer units) of a biomolecule, e.g., a nucleic acid such as DNA or RNA. Examples of sequencing methods include, but are not limited to, targeted sequencing, single molecule real-time sequencing, exon or exome sequencing, intron sequencing, electron microscopy-based sequencing, panel sequencing, transistor-mediated sequencing, direct sequencing, random shotgun sequencing, Sanger dideoxy termination sequencing, whole-genome sequencing, sequencing by hybridization, pyrosequencing, duplex sequencing, cycle sequencing, single-base extension sequencing, solid phase sequencing, high-throughput sequencing, massively parallel signature sequencing, emulsion PCR, co-amplification at lower denaturation temperature-PCR (COLD-PCR), multiplex PCR, sequencing by reversible dye terminator, paired-end sequencing, near-term sequencing, exonuclease sequencing, sequencing by ligation, short-read sequencing, single molecule sequencing, sequencing-by-synthesis, real-time sequencing, reverse-terminator sequencing, long-read sequencing, nanopore sequencing, 454 sequencing, Solexa Genome Analyzer sequencing, SOLiD™ sequencing, MS-PET sequencing, and a combination thereof. In some embodiments, sequencing can be performed by a gene analyzer such as, for example, gene analyzers commercially available from Illumina, Inc., Ultima Genomics, Inc., Pacific Biosciences, Inc., or Applied Biosystems/Thermo Fisher Scientific, among many others.

The term "next-generation sequencing" or "NGS", as used herein, generally refers to sequencing technologies having increased throughput as compared to traditional Sanger- and capillary electrophoresis-based approaches, for example, with the ability to generate hundreds of thousands of relatively small sequence reads at a time. Some examples of next-generation sequencing techniques include, but are not limited to, sequencing by synthesis, sequencing by ligation, and sequencing by hybridization. In some embodiments, next-generation sequencing includes the use of instruments capable of sequencing single molecules.

The term "personalized sequencing assay", as used herein, generally refers to a method which interrogates a select quantity of variants identified in a patient (e.g., a personalized panel or target panel) in a sequencing assay to determine the presence of a disease (e.g., detect circulating tumor DNA (ctDNA)). In some cases, the use of personalized reagents may enable a personalized sequencing assay.

The term "digital signature assay", as used herein, generally refers to a method which interrogates a substantial number of detected variants (identified in a patient) in a sequencing assay to determine the presence of a disease (e.g., detect circulating tumor DNA (ctDNA)). A digital signature assay may interrogate up to 100% (e.g., up to 90%, up to 80%) of the variants identified in a patient. The variants can be different types of variants (e.g., SNPs and insertion-deletions), or the variants can be of the same type (e.g., SNPs).

The terms "subject" and "patient" are used interchangeably herein. A "subject" can be a biological entity containing expressed genetic materials. The biological entity can be a plant, animal, or microorganism, including, for example, bacteria, viruses, fungi, and protozoa. The subject can be tissues, cells and their progeny of a biological entity obtained in vivo or cultured in vitro. The subject can be a mammal. The mammal can be a human. The subject may be diagnosed with or suspected of being at high risk for a disease, e.g., cancer. The subject may be at a predisposition for a disease. The subject may be in need of therapy or suspected of being in need of therapy. The subject may be healthy. The subject may be in remission. In some cases, the subject is not necessarily diagnosed with or suspected of being at high risk for the disease.

Where values are disclosed as ranges, it will be understood that such disclosure includes the disclosure of all possible sub-ranges within such ranges, as well as specific numerical values that fall within such ranges irrespective of whether a specific numerical value or specific sub-range is expressly stated.

The section headings used herein are for organizational purposes only and are not to be construed as limiting the subject matter disclosed.

Significant progress has been made in the prevention, diagnosis, and treatment of diseases. As a result of screening programs and improvement in diagnostic procedures, diseases can be detected at an earlier stage, and treatment advances have led to increased overall survival in patients. However, with respect to cancer, the prolonged survival of cancer patients has also led to an increase in the incidence of multiple primary malignancies, or multiple primary tumors.

Due to variabilities in the clinical presentation of second primary cancers and their low incidence, clinicians may be inexperienced at the diagnosis and treatment of this type of disease. Accordingly, there is a continued need for improved sensitivity in methods and systems for detecting second primary diseases.

Aspects disclosed herein provide a method for detecting a presence or an absence of a second primary disease in a subject, the method comprising: (a) performing a minimal residual disease (MRD) assay on a biological sample obtained or derived from the subject, wherein the subject has been previously diagnosed with a first primary disease; and (b) using a result of the MRD assay to detect the presence or the absence of the second primary disease in the subject.

Methods

The present disclosure relates generally to detection of a primary disease in a subject. More particularly, the present disclosure relates to detection of a second primary disease in a subject that has been previously diagnosed with a first primary disease and performing a minimal residual disease (MRD) assay of a biological sample of the subject.

In one aspect, provided herein is a method of detecting a second primary disease in a subject, comprising (a) performing a MRD assay on a biological sample obtained or derived from the subject, where the subject has been previously diagnosed with a first primary disease; and (b) using a result of the MRD assay to detect the presence or the absence of the second primary disease in the subject.

In another aspect, provided herein is a method of detecting a second primary disease in a subject, comprising (a) performing an assay on a biological sample obtained or derived from the subject, where the subject has been previously diagnosed with a first primary disease; and (b) using a result of the assay to detect the presence or the absence of the second primary disease in the subject.

In another aspect, provided herein is a method of detecting a second primary disease in a subject, comprising (a) performing a workflow comprising a first assay and a second assay on a biological sample obtained or derived from the subject, where the first assay comprises a MRD assay, wherein the subject has been previously diagnosed with a first primary disease; and (b) using a result of the workflow to detect the presence or the absence of the second primary disease in the subject.

In another aspect, provided herein is a method of detecting a second primary disease in a subject, comprising (a) performing an assay on a biological sample obtained or derived from the subject, where the subject has been previously diagnosed with a first primary disease, wherein the assay detects one or more genetic biomarkers and one or more epigenetic biomarkers; and (b) using a result of the assay to detect the presence or the absence of the second primary disease in the subject.

In another aspect, provided herein is a method of detecting a second primary disease in a subject, comprising (a) performing a workflow on a biological sample obtained or derived from the subject, where the subject has been previously diagnosed with a first primary disease, wherein the workflow comprises a first assay and a second assay, and wherein the first assay detects one or more genetic biomarkers and the second assay detects one or more epigenetic biomarkers; and (b) using a result of the workflow to detect the presence or the absence of the second primary disease in the subject.

In another aspect, provided herein is a method of detecting a second primary disease in a subject, comprising (a) performing a first assay and a second assay on a biological sample obtained or derived from the subject, where the subject has been previously diagnosed with a first primary disease; and (b) using a result of the second assay to detect the presence or the absence of the second primary disease in the subject.

In another aspect, provided herein is a method of detecting a second primary disease in a subject, comprising (a) performing a first assay and a second assay on a biological sample obtained or derived from the subject, where the subject has been previously diagnosed with a first primary disease, wherein the first assay is a MRD assay; and (b) using a result of the second assay to detect the presence or the absence of the second primary disease in the subject.

In another aspect, provided herein is a method of detecting a second primary disease in a subject, comprising (a) performing a first assay and a second assay on a biological sample obtained or derived from the subject, where the subject has been previously diagnosed with a first primary disease, wherein the first assay is configured to detect genetic biomarkers and the second assay is configured to detect epigenetic biomarkers; and (b) using a result of the second assay to detect the presence or the absence of the second primary disease in the subject.

In another aspect, provided herein is a method of detecting a second primary disease in a subject that has been previously diagnosed with a first primary disease and performing a workflow on a biological sample of the subject. In some embodiments, the method comprises performing Whole Genome Sequencing (WGS) on the subject's first primary disease (e.g., first tumor). In some embodiments, a digital signature (e.g., mutation signature) of the subject's first primary disease is generated based on the results of the WGS assay. In some embodiments, WGS is performed on sample comprising cell-free DNA (cfDNA) from the subject. In some embodiments, the results of the cfDNA WGS are analyzed a first time in a tumor-informed manner to determine presence or absence of the first primary disease. In some embodiments, the results of the cfDNA WGS are analyzed a second time in a tumor-naïve manner (e.g., analyzing fragmentomic pattern or methylation pattern) to determine the presence or absence of a second primary disease. In some embodiments, the first analysis is a tumor-informed analysis and the second analysis is a tumor-naïve analysis. In some embodiments, the first analysis comprises the use of genetic data and the second analysis comprises the use of epigenetic data. In some embodiments, the results of a (e.g., single) workflow are analyzed twice. In some embodiments, the workflow comprises a first assay and a second assay, where the first assay is an MRD assay and the second assay is a disease detection assay (e.g., cancer detection assay).

In another aspect, provided herein is a method of detecting a second primary disease in a subject that has been previously diagnosed with a first primary disease and performing a workflow on a biological sample of the subject. In some embodiments, the method comprises performing Whole Genome Sequencing (WGS) on the subject's first primary disease (e.g., first tumor). In some embodiments, the method comprises performing Whole Exome Sequencing (WES) on the subject's first primary disease (e.g., first tumor). In some embodiments, a personalized panel of genetic markers associated with the subject's first primary disease is generated based on the results of the sequencing assay. In some embodiments, the workflow comprises a first assay and a second assay, where the first assay is a MRD assay and the second assay is a disease detection assay (e.g., cancer detection assay). In some embodiments, a first assay is performed comprising targeted sequencing of a sample comprising cfDNA from the subject, based on the personalized panel. In some embodiments, a second assay is performed by targeting regions based on epigenetic changes (e.g., over methylated target regions or under methylated target regions). In some embodiments, results from the first assay are analyzed to determine the presence or absence of the first primary disease in the subject. In some embodiments, results from the second assay are analyzed to determine the presence or absence of the second primary disease in the subject. In some embodiments, the first assay and the second assay are different assays. In some embodiments, the first assay is a tumor-informed assay and the second assay is a tumor-naïve assay. In some embodiments, both the first assay and the second assay are tumor-informed. In some embodiments, analyzing the results from the first assay comprises the use of genetic data. In some embodiments, analyzing the results from the second assay comprises the use of epigenetic data. In some embodiments, the first assay and the second assay occur in parallel.

In some cases, a subject is diagnosed with a first primary disease, however, the subject may also have an unknown disease, for example, a second primary disease. In some cases, the subject may show signs or symptoms of the second primary disease. In other cases, the subject may be asymptomatic for the second primary disease. There exists a need for methods and systems that can detect an unknown disease (e.g., a second primary disease) in a subject that has been diagnosed with a first primary disease.

Disclosed herein are methods and systems for detecting an unknown disease (e.g., a second primary disease) in a subject diagnosed with a first primary disease. The present disclosure provides methods of detecting an unknown disease in a subject with improved accuracy, sensitivity, specificity, or a combination thereof. The present disclosure provides workflows capable of detecting minimal residual disease (MRD) and detecting new disease (e.g., genetically distinct disease). A workflow may comprise one or more assays. In some embodiments, an assay may be capable of detecting diseases (e.g., cancer detection assays). In some embodiments, an assay may comprise a minimal residual disease (MRD) assay. In some embodiments, an assay may comprise polymerase chain reaction (PCR), flow cytometry, sequencing (e.g., Next-Generation Sequencing), amplification, target enrichment (e.g., hybrid capture), methylation assays, proteomic assays, fragmentomic assays, fluorescence in situ hybridization (FISH), immunohistochemistry, mass spectrometry, tumor informed assays, tumor naïve assays, epigenetic assays, genetic assays, or a combination thereof. In some embodiments, an assay within a workflow may be utilized to detect the presence of a previously undetected second primary disease in a subject. In some embodiments, an assay within a workflow may be utilized to detect the presence of a previously undetected second primary disease in a subject in addition to detecting the presence or absence of a previously diagnosed first primary disease.

The present disclosure provides methods for detecting a presence or an absence of a primary disease in a subject. The methods may comprise performing a minimal residual disease (MRD) assay on a biological sample. A workflow may comprise performing an MRD assay on a biological sample. The biological sample may be obtained or derived from a subject. The subject may have been previously diagnosed with a primary disease. The methods may comprise using resulting data of the MRD assay. The result of the MRD assay may be used to detect a presence or an absence of a primary disease in a subject. The primary disease may be a second primary disease. The primary disease may be a first primary disease. The result of the MRD assay may be used to detect a presence or an absence of both a first primary disease and a second primary disease. For example, different features of the resulting data of the MRD assay can be analyzed to determine the absence or presence of a first primary disease and the absence or presence of a second primary disease.

In some cases, the methods provided herein may allow for earlier detection or confirmation of a second primary disease in a subject. In some embodiments, the methods provided herein may allow for earlier detection or confirmation of a second primary disease in a subject relative to otherwise similar methods utilizing a biological sample to solely determine MRD of a previously diagnosed first primary disease. In some cases, a patient that has previously been diagnosed with a first primary disease (e.g., cancer or tumor) may develop a second primary disease (e.g., cancer or tumor) during the course of treatment for the first primary disease. Existing tests may not be designed or used for detecting the development of a new disease (e.g., a second primary disease) in conjunction with determining MRD of an existing disease (e.g., a first primary disease). In some cases, a patient may exhibit symptoms which may raise a clinician's suspicion of a second primary disease. Existing protocols may require additional testing and/or imaging to confirm the clinician's suspicion of a second primary disease, which may take time to schedule and execute, thus allowing the second primary disease to progress. In some embodiments, the methods provided herein may reduce the time between suspicion of a second primary disease and diagnosis of the second primary disease by at least 10%, at least 20%, at least 30%, at least 40%, at least 50%, at least 60%, at least 70%, at least 80%, at least 90%, at least 100%, or more, relative to a protocol requiring additional testing and/or imaging to confirm a clinician's suspicion of a second primary disease.

In some cases, the methods provided here may allow for more effective or tailored therapy for a patient. In some embodiments, a workflow, as provided herein, may comprise a first assay which may detect MRD in a subject and a second assay which may detect a new disease, and the first assay and second assay are performed in parallel (e.g., on a same biological sample). In some cases, the methods provided here may allow for more effective or tailored therapy for a patient relative to otherwise similar methods utilizing a biological sample to solely determine MRD of a previously diagnosed first primary disease, or an otherwise similar method utilizing a biological sample to solely screen for a new disease. In some embodiments, the methods provided herein may make a clinician aware of a second primary disease in a patient sooner (relative to an otherwise similar method utilizing a biological sample to solely determine MRD a previously diagnosed first primary disease, or an otherwise similar method utilizing a biological sample to solely screen for new disease), and the clinician may be able to recommend a more effective treatment for the patient based on the knowledge of the second primary disease.

The methods may comprise obtaining a biological sample. The biological sample may be obtained from a subject. The biological sample may be derived from a subject. In some embodiments, the biological sample comprises a blood sample, a plasma sample, a buffy coat sample, a serum sample, a urine sample, a saliva sample, a cerebrospinal fluid sample, a stool sample, a lymph sample, a bone marrow sample, a tissue sample, a tumor sample. The biological sample may comprise a blood sample. The biological sample may comprise a plasma sample. The biological sample may comprise a buffy coat sample. The biological sample may comprise a serum sample. The biological sample may comprise a urine sample. The biological sample may comprise a saliva sample. The biological sample may comprise a cerebrospinal fluid sample. The biological sample may comprise a stool sample. The biological sample may comprise a lymph sample. The biological sample may comprise a bone marrow sample. The biological sample may comprise a tissue sample. The biological sample may comprise a tumor sample.

In some embodiments, the biological sample comprises nucleic acids. The nucleic acids may comprise deoxyribonucleic acid (DNA), ribonucleic acid (RNA), or a combination thereof. The nucleic acids may comprise DNA. The nucleic acids may comprise RNA. The nucleic acids may comprise DNA and RNA. In some embodiments, the DNA comprises single-stranded DNA (ssDNA), double-stranded DNA (dsDNA), or a combination thereof. In some embodiments, the DNA comprises circulating tumor DNA (ctDNA), cell-free DNA (cfDNA), or a combination thereof. The DNA may comprise ctDNA. The DNA may comprise cfDNA. The DNA may comprise ctDNA and cfDNA. In some embodiments, the RNA comprises ribosomal RNA (rRNA), messenger RNA (mRNA), transfer RNA (tRNA), or a combination thereof. The RNA may comprise rRNA. The RNA may comprise mRNA. The RNA may comprise tRNA.

In some embodiments, the biological sample comprises a cell-free biological sample. The cell-free biological sample may comprise a plasma sample. The cell-free biological sample may comprise a serum sample. The cell-free biological sample may comprise a urine sample. The biological sample may be substantially cell-free. The biological sample may be completely cell-free.

In some embodiments, the cell-free biological sample comprises cell-free deoxyribonucleic acid (cfDNA), cell-free ribonucleic acid (cfRNA), or a combination thereof. The cell-free biological sample may comprise cfDNA. The cell-free biological sample may comprise cfRNA. The cell-free biological sample may comprise cfDNA and cfRNA.

In some embodiments, the biological sample may be obtained by a biopsy. The biopsy may comprise a fine needle aspiration (FNA). The biopsy may comprise a core needle biopsy. The biopsy may comprise a stereotactic biopsy. The biopsy may comprise an excisional biopsy, a bone marrow biopsy, an endometrial biopsy, an endoscopic biopsy, an incisional biopsy, a colposcopic biopsy, a needle biopsy, a skin biopsy, a lymph node biopsy, or a combination thereof. The biological sample may be substantially obtained by a biopsy. The biological sample may be completely obtained by a biopsy.

The methods provided herein may use any suitable biological sample. In some embodiments, a single biological sample may be used to perform a workflow. In some embodiments, a single biological sample may be used to perform a first assay (e.g. MRD assay) and a second assay. For example, a single biological sample may be used to perform a genetic assay and an epigenetic assay.

In some embodiments, different biological samples may be used to perform a first assay (e.g., MRD assay) and a second assay. The different biological samples may be of the same type (e.g., blood sample). The different biological samples may be of different types (e.g., blood sample and urine sample).

In some embodiments, the subject may be a mammal. For example, the mammal may include a mouse, a rat, a gerbil, a guinea pig, a hamster, a fox, a dog, a monkey, a sheep, a cow, a pig, or the like. The mammal may include a monkey. For example, the mammal may comprise a chimpanzee, a bonobo, an orangutan, a baboon, or the like. The subject may be a human. The subject may be an adult (e.g., at least 18 years of age). The subject may be a child (e.g., less than 18 years of age). The subject may be a male. The subject may be a female. The subject may be suspected of having a primary disease, for example, a first primary disease, a second primary disease, or both. The subject may not be suspected of having a primary disease, for example, a first primary disease, a second primary disease, or both. The subject may be suspected of having a first primary disease and not suspected of having a second primary disease. The subject may be suspected of having a second primary disease and not suspected of having a first primary disease.

The subject may have one or more symptoms of a first primary disease, a second primary disease, or both. For example, the subject may have one or more, two or more, three or more, four or more, five or more, six or more, seven or more, eight or more, nine or more, ten or more, 11 or more, 12 or more, 13 or more, 14 or more, 15 or more, 16 or more, 17 or more, 18 or more, 19 or more, or 20 or more symptoms of a first primary disease, a second primary disease, or both. The subject may have one or more, two or more, three or more, four or more, five or more, six or more, seven or more, eight or more, nine or more, ten or more, 11 or more, 12 or more, 13 or more, 14 or more, 15 or more, 16 or more, 17 or more, 18 or more, 19 or more, or 20 or more symptoms of a first primary disease. The subject may have one or more, two or more, three or more, four or more, five or more, six or more, seven or more, eight or more, nine or more, ten or more, 11 or more, 12 or more, 13 or more, 14 or more, 15 or more, 16 or more, 17 or more, 18 or more, 19 or more, or 20 or more symptoms of a second primary disease. The subject may have one or more, two or more, three or more, four or more, five or more, six or more, seven or more, eight or more, nine or more, ten or more, 11 or more, 12 or more, 13 or more, 14 or more, 15 or more, 16 or more, 17 or more, 18 or more, 19 or more, or 20 or more symptoms of an additional disease (e.g., a third primary disease). The subject may be asymptomatic of a first primary disease. The subject may be asymptomatic of a second primary disease.

The subject may have received a diagnosis of a first primary disease. The subject may have received a diagnosis of a second primary disease. The subject may have received a diagnosis of a first primary disease and a second primary disease. The subject may have received a diagnosis of the first primary disease but not a second primary disease. The subject may have received a diagnosis of the second primary disease but not a first primary disease. The subject may not have received a diagnosis of a first primary disease. The subject may not have received a diagnosis of a second primary disease. The subject may not have received a diagnosis of a first primary disease and a second primary disease. In some cases, the subject may be in remission from the first primary disease. In some cases, the subject may no longer be testing positive for the primary disease.

The systems and methods provided herein can comprise any suitable workflow capable of detecting the presence or absence of a disease. In some embodiments, a workflow may comprise one or more assays. In some embodiments, a workflow may comprise a plurality of assays (e.g., two or more assays). In some embodiments, an assay may be a disease detection assay. In some embodiments, an assay may be a cancer detection assay (e.g., cancer screening assay). In some embodiments, an assay may be capable of detecting biomarkers associated with a disease (e.g., cancer). In some embodiments, an assay is an MRD assay.

In some embodiments, a workflow may comprise a first assay and a second assay. The first assay may be capable of determining MRD and the second assay may be capable of screening for a new disease using a single biological sample from a subject. In some embodiments, a first assay may be capable of determining MRD and a second assay may be capable screening for a new disease simultaneously (e.g., in parallel). In some embodiments, a first assay may be configured to determine MRD and a second assay may be configured to screen for a new disease using a single biological sample from a subject. In some embodiments, a first assay may be configured to determine MRD and a second assay may be configured to screen for a new disease simultaneously (e.g. in parallel).

The methods provided herein may comprise any suitable workflow. The workflow may comprise a genetic assay. The workflow may comprise an epigenetic assay. The workflow may comprise a tumor-informed assay. The workflow may comprise a tumor-naïve assay. The workflow may comprise a tumor-informed genetic assay. The workflow may comprise a tumor-informed epigenetic assay. The workflow may comprise a tumor-naïve genetic assay. The workflow may comprise a tumor-naïve epigenetic assay. In some embodiments, a workflow may comprise a MRD assay, polymerase chain reaction (PCR), flow cytometry, a sequencing assay (e.g., NGS), a methylation assay, fluorescence in situ hybridization (FISH), immunohistochemistry, mass spectrometry, target enrichment (e.g., hybrid capture), amplification, a fragmentomics assay, a proteomics assay, or any combination thereof. The workflow may comprise PCR. The workflow may comprise flow cytometry. The workflow may comprise a sequencing assay. The workflow may comprise a methylation assay. The workflow may comprise fluorescence in situ hybridization (FISH). The workflow may comprise immunohistochemistry. The workflow may comprise mass spectrometry. The workflow may comprise amplification. The workflow may comprise target enrichment (e.g., hybrid capture). The workflow may comprise a fragmentomics assay. The workflow may comprise a proteomics assay.

The methods provided herein may comprise any suitable PCR or amplification assays. A method may comprise a workflow comprising PCR. In some embodiments, an assay (e.g., of a workflow) may comprise PCR. The PCR may be any suitable PCR. The PCR may comprise real-time quantitative PCR (RT-qPCR). The PCR may comprise digital PCR (dPCR). The PCR may comprise droplet digital PCR (ddPCR). The PCR may comprise multiplex PCR. The PCR may comprise nested PCR. The PCR may comprise reverse transcription PCR (RT-PCR). The PCR may comprise in situ PCR. The PCR may comprise assembly PCR, asymmetric PCR, end-point PCR, microfluidic PCR, hot start PCR, long range PCR, cold PCR, or a combination thereof.

The methods provided herein may comprise any suitable sequencing assays. A method may comprise a workflow comprising a sequencing assay. In some embodiments, an assay (e.g., of a workflow) may comprise a sequencing assay. The sequencing assay can be any suitable sequencing assay. The sequencing assay may comprise next generation sequencing (NGS). The sequencing assay may comprise deoxyribonucleic acid (DNA) sequencing. The sequencing assay may comprise ribonucleic acid (RNA) sequencing. The sequencing assay may comprise pyrosequencing. The sequencing may comprise whole genome sequencing (WGS). The sequencing may comprise whole transcriptome sequencing. The sequencing may comprise whole exome sequencing (WES). The sequencing may comprise targeted sequencing. The sequencing may comprise shotgun sequencing. The sequencing may comprise single-cell sequencing. The sequencing may comprise Sanger sequencing. The sequencing may comprise SOLiD sequencing. The sequencing may comprise paired plus minus sequencing (ppmSeq). The sequencing may comprise ion semiconductor sequencing. The sequencing may comprise sequencing by synthesis. The sequencing may comprise DNA nanoball sequencing. The sequencing may comprise polony sequencing. The sequencing may comprise bridge PCR sequencing.

The methods provided herein may comprise any suitable methylation assay. A method may comprise a workflow comprising a methylation assay. In some embodiments, an assay (e.g., of a workflow) may comprise a methylation assay. A methylation assay may comprise detecting methylation or a methylation pattern of nucleic acids obtained or derived from a biological sample of a subject. The methylation assay may comprise enzymatic methyl sequencing (EM-Seq). The methylation assay may comprise nanopore sequencing. The methylation assay may comprise bisulfite sequencing. The methylation assay may comprise a methylation enrichment assay.

The methods provided herein may comprise any suitable tumor-informed and/or tumor-naïve assays. A method may comprise a workflow comprising a tumor-informed and/or tumor-naïve assay. In some embodiments, an assay (e.g., of a workflow) may be a tumor-informed assay or a tumor-naïve assay. In some embodiments, the assay may be a tumor informed assay, a tumor naïve assay, or a combination thereof. The assay may be a tumor informed assay. The assay may be a tumor naïve assay. The assay may be a tumor informed assay and a tumor naïve assay.

The methods provided herein may comprise any suitable tumor-informed assay. A method may comprise a workflow comprising a tumor-informed assay. In some embodiments, an assay (e.g., of a workflow) may comprise a tumor-informed assay. The tumor informed assay may utilize information from a subject's tumor to guide an analysis of a subject's biological sample. The tumor informed assay may assess one or more biomarkers. The tumor informed assay may assess genetic biomarkers. The tumor-informed assay may assess epigenetic biomarkers. In some embodiments, an epigenetic biomarker may be used in a tumor-informed context, where a cancer-specific epigenetic biomarker is determined, and later a sample comprising cfDNA is analyzed for that that same cancer-specific epigenetic. For example, a methylation pattern may be determined from a tumor sample, and later, a biological sample comprising cfDNA may be analyzed and search for the methylation pattern identified from the tumor sample. In another example, an epigenetic biomarker may be used to weight a detected genetic biomarker signal. The tumor-informed assay may assess structural variants (SVs), non-structural variants, or both. The tumor-informed assay may assess single nucleotide variants (SNVs), single nucleotide polymorphisms (SNPs), double base substitutions, insertion-deletions (indels), copy number variations (CNVs), inversions, translocations, tandem repeats (TRs), short tandem repeats (STRs), variable number tandem repeats (VNTRs), quasi-tandem repeats (QTRs), viral integration, fragment length (e.g., fragmentomics), methylation, cytosine methylation, histone modification, or a combination thereof. The tumor-informed assay may assess structural variants. The tumor-informed assay may assess single nucleotide variants. The tumor-informed assay may assess single nucleotide polymorphisms. The tumor-informed assay may assess double base substitutions. The tumor-informed assay may assess indels. The tumor-informed assay may assess CNVs. The tumor-informed assay may assess inversions. The tumor-informed assay may assess translocations. The tumor-informed assay may assess TRs. The tumor-informed assay may assess STRs. The tumor-informed assay may assess VNTRs. The tumor-informed assay may assess QTRs. The tumor-informed assay may assess histone modification. The tumor-informed assay may assess methylation. The tumor-informed assay may assess cytosine methylation. For example, cancer-specific methylation can be identified in a tumor, and later that cancer-specific methylation can be searched for in a sample comprising cfDNA to determine presence of the cancer in a subject. The tumor-informed assay may assess fragment length (e.g., for a fragmentomics analysis). For example, a fragmentomics assay signal may be used to weight, for example, a SNV signal identified in a fragment as being of a certain origin.

The methods provided herein may comprise any suitable tumor-naïve assay. A method may comprise a workflow comprising a tumor-naïve assay. In some embodiments, an assay (e.g., of a workflow) may comprise a tumor-naïve assay. The tumor naïve assay may utilize information from a subject's non-tumor biological sample (e.g., ctDNA in blood or plasma) to guide an analysis of the subject's biological sample. The tumor naïve assay may assess one or more biomarkers. The tumor naïve assay may assess genetic biomarkers. The tumor-naïve assay may assess epigenetic biomarkers. The tumor naïve assay may assess methylation, cytosine methylation, copy number variation (CNV), fragment length (e.g., fragmentomics), histone modification, or a combination thereof. The tumor naïve assay may assess methylation. The tumor naïve assay may assess cytosine methylation. The tumor naïve assay may assess copy number variation. The tumor naïve assay may assess fragment length. The tumor naïve assay may assess histone modification.

The methods provided herein may comprise any suitable genetic and/or epigenetic assays. A method may comprise a workflow comprising a genetic and/or epigenetic assay. In some embodiments, an assay (e.g., of a workflow) may comprise a genetic assay or an epigenetic assay. In some embodiments, the workflow may comprise a genetic (assessment) assay, an epigenetic (assessment) assay, or a combination thereof. The workflow may comprise a genetic (assessment) assay. The workflow may comprise an epigenetic (assessment) assay. The workflow may comprise a genetic (assessment) assay and an epigenetic (assessment) assay.

The systems and methods provided herein can comprise any suitable number of assays. A method may comprise a workflow, and a workflow may comprise any suitable number of assays. In some embodiments, the methods comprise one or more assays. In some embodiments, the methods may comprise at least one, at least two, at least three, at least four, at least five, at least six, at least seven, at least eight, at least nine, or at least ten assays. In some embodiments, the methods may comprise at most ten, at most nine, at most eight, at most seven, at most six, at most five, at most four, at most three, or at most two assays.

In some embodiments, the methods comprise one assay (e.g., within a workflow). For example, in some embodiments, the methods comprise one MRD assay (e.g., within a workflow). In some embodiments, the methods comprise two MRD assays. In some embodiments, the methods comprise three MRD assays. In some embodiments, the methods comprise four MRD assays. In some embodiments, the methods comprise five MRD assays. In some embodiments, a first assay may be an MRD assay and a second assay may be an MRD assay. For example, a result of a second assay may be consistent with the presence of the first primary disease, therefore the second assay determined MRD of the first primary disease.

In some embodiments, a workflow may comprise a first assay and a second assay. In some embodiments, the first assay and the second assay are different assays. In some embodiments, the first assay may comprise a MRD assay and the second assay may comprise another assay described herein. In some embodiments, the first assay may comprise a MRD assay and the second assay may comprise a methylation assay. In some embodiments, the first assay may comprise a MRD assay and the second assay may comprise a fragmentomics assay. In some embodiments, the first assay may comprise a genetic assay and the second assay may comprise an epigenetic assay. In some embodiments, the first assay may comprise a tumor-informed assay and the second assay may comprise a tumor-naïve assay. In some embodiments, the first assay may comprise polymerase chain reaction (PCR) and the second assay may comprise flow cytometry. In some embodiments, the first assay may comprise polymerase chain reaction (PCR) and the second assay may comprise a sequencing assay. In some embodiments, the first assay may comprise polymerase chain reaction (PCR) and the second assay may comprise a methylation assay. In some embodiments, the first assay may comprise polymerase chain reaction (PCR) and the second assay may comprise fluorescence in situ hybridization (FISH). In some embodiments, the first assay may comprise polymerase chain reaction (PCR) and the second assay may comprise immunohistochemistry. In some embodiments, the first assay may comprise polymerase chain reaction (PCR) and the second assay may comprise mass spectrometry. In some embodiments, the first assay may comprise flow cytometry and the second assay may comprise PCR. In some embodiments, the first assay may comprise flow cytometry and the second assay may comprise a sequencing assay. In some embodiments, the first assay may comprise flow cytometry and the second assay may comprise FISH. In some embodiments, the first assay may comprise flow cytometry and the second assay may comprise immunohistochemistry. In some embodiments, the first assay may comprise flow cytometry and the second assay may comprise mass spectrometry. In some embodiments, the first assay may comprise a methylation assay and the second assay may comprise PCR. In some embodiments, the first assay may comprise a methylation assay and the second assay may comprise flow cytometry. In some embodiments, the first assay may comprise a methylation assay and the second assay may comprise a sequencing assay. In some embodiments, the first assay may comprise a methylation assay and the second assay may comprise FISH. In some embodiments, the first assay may comprise a methylation assay and the second assay may comprise immunohistochemistry. In some embodiments, the first assay may comprise a methylation assay and the second assay may comprise mass spectrometry. In some embodiments, the first assay may comprise fluorescence in situ hybridization (FISH) and the second assay may comprise PCR. In some embodiments, the first assay may comprise fluorescence in situ hybridization (FISH) and the second assay may comprise flow cytometry. In some embodiments, the first assay may comprise fluorescence in situ hybridization (FISH) and the second assay may comprise a sequencing assay. In some embodiments, the first assay may comprise fluorescence in situ hybridization (FISH) and the second assay may comprise immunohistochemistry. In some embodiments, the first assay may comprise fluorescence in situ hybridization (FISH) and the second assay may comprise mass spectrometry. In some embodiments, the first assay may comprise immunohistochemistry and the second assay may comprise PCR. In some embodiments, the first assay may comprise immunohistochemistry and the second assay may comprise flow cytometry. In some embodiments, the first assay may comprise immunohistochemistry and the second assay may comprise a sequencing assay. In some embodiments, the first assay may comprise immunohistochemistry and the second assay may comprise a methylation assay. In some embodiments, the first assay may comprise immunohistochemistry and the second assay may comprise FISH. In some embodiments, the first assay may comprise immunohistochemistry and the second assay may comprise mass spectrometry. In some embodiments, the first assay may comprise mass spectrometry and the second assay may comprise PCR. In some embodiments, the first assay may comprise mass spectrometry and the second assay may comprise flow cytometry. In some embodiments, the first assay may comprise mass spectrometry and the second assay may comprise a sequencing assay. In some embodiments, the first assay may comprise mass spectrometry and the second assay may comprise a methylation assay. In some embodiments, the first assay may comprise mass spectrometry and the second assay may comprise FISH. In some embodiments, the first assay may comprise mass spectrometry and the second assay may comprise immunohistochemistry. In some embodiments, the first assay may comprise a sequencing assay and the second assay may comprise PCR. In some embodiments, the first assay may comprise a sequencing assay and the second assay may comprise flow cytometry. In some embodiments, the first assay may comprise a sequencing assay and the second assay may comprise a methylation assay. In some embodiments, the first assay may comprise a sequencing assay and the second assay may comprise FISH. In some embodiments, the first assay may comprise a sequencing assay and the second assay may comprise immunohistochemistry. In some embodiments, the first assay may comprise a sequencing assay and the second assay may comprise mass spectrometry. In some embodiments, the first assay may be a tumor informed assay and the second assay may be tumor naïve assay. In some embodiments, the first assay may be a tumor naïve assay and the second assay may be a tumor informed assay. In some embodiments, the first assay may be a genetic assay and the second assay may be an epigenetic assay. In some embodiments, the first assay may be an epigenetic assay and the second assay may be genetic assay.

In some embodiments, a workflow may comprise a first assay and a second assay. In some embodiments, the first assay and the second assay are the same assay. In some embodiments, the first assay and the second assay may comprise a tumor-informed assay. In some embodiments, the first assay and the second assay may comprise a tumor-naive assay. In some embodiments, the first assay and the second assay may comprise a genetic assay. In some embodiments, the first assay and the second assay may comprise an epigenetic assay. In some embodiments, the first assay and the second assay may comprise PCR. In some embodiments, the first assay and the second assay may comprise target enrichment. In some embodiments, the first assay and the second assay may comprise amplification. In some embodiments, the first assay and the second assay may comprise flow cytometry. In some embodiments, the first assay and the second assay may comprise sequencing assays. In some embodiments, the first assay and the second assay may comprise methylation assays. In some embodiments, the first assay and the second assay may comprise FISH. In some embodiments, the first assay and the second assay may comprise immunohistochemistry. In some embodiments, the first assay and the second assay may comprise mass spectrometry.

In some embodiments, a workflow may combine a plurality of assays when being performed on a biological sample. In some embodiments, a first assay and a second assay are performed concurrently (e.g., at the same time point). For example, a genetic assay and an epigenetic assay may be performed on a biological sample at the same time. For example, nucleic acids comprising genetic biomarkers in a biological sample may be captured and nucleic acids comprising epigenetic biomarkers in the same biological sample may be captured, and the captured nucleic acids may be analyzed (e.g., sequenced) in parallel. In some embodiments, a first assay and/or a second assay are developed separately but performed simultaneously as part of a workflow (e.g., combined workflow).

In some embodiments, a workflow may combine a plurality of assays when being performed on a biological sample. In some embodiments, the first assay and the second assay are performed at distinct time points. In some embodiments, the first assay is performed at a first time point and the second assay is performed at a second time point. In some embodiments, the first time point is at a time before the second time point. For example, the first time point may be about 5 seconds, about 10 seconds, about 30 seconds, about 1 minute, about 5 minutes, about 10 minutes, about 30 minutes, about 1 hour, about 2 hours, about 3 hours, about 4 hours, about 5 hours, about 6 hours, about 7 hours, about 8 hours, about 9 hours, about 10 hours, about 11 hours, about 12 hours, about 18 hours, about 1 day, about 2 days, about 3 days, about 4 days, about 5 days, about 6 days, about 7 days, about 8 days, about 9 days, about 10 days, about 11 days, about 12 days, about 13 days, about 13 days, about 2 weeks, about 3 weeks, about 4 weeks, about 5 weeks, about 6 weeks, about 7 weeks, about 8 weeks, about 9 weeks, or about 10 weeks or more before the second time point. The first time point may about 5 seconds to about 3 hours before the second time point. For example, a genetic assay may be performed on a biological sample first, and an epigenetic assay may be performed on the biological sample subsequent to the genetic assay.

The methods provided herein may be performed on any suitable biological sample. In some embodiments, the assays provided herein may be performed on any suitable biological sample. In some embodiments, the first assay and the second assay are performed on a biological sample. The first assay and the second assay may be performed on the same biological sample from a subject. For example, a blood sample may be used for the first assay and the same blood sample may be used for the second assay. In another example, a same blood sample may be split or partitioned such that two or more subsets of the same blood sample are created. In some embodiments, one subset may be used for a first assay and another subset is used for the second assay. One or more subsets may be stored for additional testing and validation. In some embodiments, the methods provided herein may generate less wastage of a biological sample relative to an otherwise similar method not using the entirety of a sample for collecting data. In some embodiments, the first assay and the second assay are performed on different biological samples. In some embodiments, the first and second biological samples are from the same time points. In some embodiments, the first and second biological samples are from distinct time points. For example, the first assay may be performed on a first biological sample (e.g., a first blood sample taken at a first time point) and the second assay may be performed on a second biological sample (e.g., a second blood sample taken at a second time point). In some embodiments, the first and second biological sample are from a same origin (e.g., a blood sample or a tumor sample). In some embodiments, the first and second biological sample are from distinct origins (e.g., a tumor sample and a blood sample). The biological sample may be a blood sample, or any biological sample as described herein. In some embodiments, a first biological sample may be a tumor sample. In some embodiments, a second biological sample may be a blood sample.

A workflow may detect the presence or absence of a first primary disease and a second primary disease. In some embodiments, the first assay of a workflow detects a first primary disease and the second assay of a workflow detects a second primary disease.

In some embodiments, the first assay detects one or more additional diseases. In some embodiments, the second assay detects one or more additional diseases. In some embodiments the first assay detects the first primary disease. In some embodiments, the second assay detects the second primary disease. In some embodiments, the second assay detects the first primary disease.

The methods provided herein may comprise any suitable personalized sequencing assay and/or digital signature assays. A method may comprise a workflow comprising a personalized sequencing assay and/or digital signature assay. In some embodiments, an assay (e.g., of a workflow) may comprise a personalized sequencing assay or a digital signature assay. In some embodiments, an assay (e.g., the first assay or the second assay) comprises a personalized sequencing assay, a digital signature assay, or a combination thereof. The assay may comprise a personalized sequencing assay. The assay may comprise a digital signature assay. The personalized sequencing assay may detect a plurality of genetic changes, a plurality of epigenetic changes, or a combination thereof that has been previously identified in a sample of the first primary disease. The personalized sequencing assay may detect a plurality of genetic changes that have been previously identified in a sample of the first primary disease. The personalized sequencing assay may detect a plurality of epigenetic changes that have been previously identified in a sample of the first primary disease. The personalized sequencing assay may detect a plurality of genetic changes and epigenetic changes that have been previously identified in a sample of the first primary disease.

The digital signature assay may detect a plurality of genetic changes, a plurality of epigenetic changes, or a combination thereof that has been previously identified in a sample of the first primary disease. The digital signature assay may detect a plurality of genetic changes that have been previously identified in a sample of the first primary disease. The digital signature assay may detect a plurality of epigenetic changes that have been previously identified in a sample of the first primary disease. The digital signature assay may detect a plurality of genetic changes and epigenetic changes that have been previously identified in a sample of the first primary disease. The plurality of epigenetic changes may comprise histone markers (e.g., methylation). The plurality of epigenetic changes may comprise DNA binding factors, for example, transcription factors, insulators, or the like. The plurality of epigenetic changes may comprise nucleosome positioning. The plurality of epigenetic changes may comprise chromatin accessibility assessments (e.g., DNase I hypersensitive sites sequencing (DNAse-seq), Formaldehyde-assisted isolation of regulatory elements (FAIRE-seq), Assay for transposase-accessible chromatin with sequencing (ATAC-seq), or the like). An assay may be the first assay (of a workflow) or the second assay (of a workflow).

The methods provided herein may comprise any suitable epigenetic assays. A method may comprise a workflow comprising an epigenetic assay. In some embodiments, an assay (e.g., of a workflow) may comprise an epigenetic assay. In some embodiments, the first assay of a workflow comprises detection of epigenetic changes. In some embodiments, the second assay of a workflow comprises detection of epigenetic changes. In some embodiments, the first assay comprises a methylation assay, a fragmentation assay, a protein detection assay, or a combination thereof. In some embodiments, the second assay comprises a methylation assay, a fragmentation assay, a protein detection assay, or a combination thereof.

The systems and methods provided herein can comprise any suitable methylation assay. A method may comprise a workflow comprising a methylation assay. In some embodiments, an assay (e.g., of a workflow) may comprise a methylation assay. A methylation assay may comprise detecting methylation or a methylation pattern of nucleic acids obtained or derived from a biological sample of a subject. A first assay may comprise a methylation assay. A second assay may comprise a methylation assay. The methylation assay may comprise bisulfite sequencing, enzymatic methyl sequencing (EM-Seq), nanopore sequencing, or a methylation enrichment assay. In some embodiments, the methylation assay comprises the bisulfite sequencing. In some embodiments, the methylation assay comprises the EM-Seq. In some embodiments, the methylation assay comprises the nanopore sequencing. In some embodiments, the methylation assay comprises the methylation enrichment assay. For example, a methylation enrichment assay may comprise enriching for methylated DNA and correlating with known cancer genes.

The systems and methods provided herein may comprise use of any suitable fragmentation assay (e.g., fragmentomics). A method may comprise a workflow comprising a fragmentation assay. In some embodiments, an assay (e.g., of a workflow) may comprise a fragmentation assay. A fragmentation assay may comprise detecting a fragmentation pattern and/or determining fragment length of nucleic acids obtained or derived from a biological sample of a subject. A first assay of workflow may comprise a fragmentation assay. A second assay of a workflow may comprise a fragmentation assay. The fragmentation assay may comprise an analysis of fragment lengths of nucleic acids. In some embodiments, a fragment length analysis (e.g., fragment length distribution analysis, fragment level analysis, fragment location analysis) may be indicative of an origin of a fragment, or of a particular cancer. In some embodiments, the fragment lengths may be about 5 nucleotides to about 500 nucleotides. The fragment lengths may be more than or equal to about 5 nucleotides, about 10 nucleotides, about 15 nucleotides, about 20 nucleotides, about 25 nucleotides, about 30 nucleotides, about 35 nucleotides, about 40 nucleotides, about 45 nucleotides, about 50 nucleotides, about 55 nucleotides, about 60 nucleotides, about 65, about 70 nucleotides, about 75 nucleotides, about 80 nucleotides, about 85 nucleotides, about 90 nucleotides, about 95 nucleotides, about 100 nucleotides, about 110 nucleotides, about 120 nucleotides, about 130 nucleotides, about 140 nucleotides, about 150 nucleotides, about 160 nucleotides, about 170 nucleotides, about 180 nucleotides, about 190 nucleotides, about 200 nucleotides, about 210 nucleotides, about 220 nucleotides, about 230 nucleotides, about 240 nucleotides, about 250 nucleotides, about 260 nucleotides, about 270 nucleotides, about 280 nucleotides, about 290 nucleotides, about 300 nucleotides, about 310 nucleotides, about 320 nucleotides, about 330 nucleotides, about 340 nucleotides, about 350 nucleotides, about 360 nucleotides, about 370 nucleotides, about 380 nucleotides, about 390 nucleotides, about 400 nucleotides, about 410 nucleotides, about 420 nucleotides, about 430 nucleotides, about 440 nucleotides, about 450 nucleotides, about 460 nucleotides, about 470 nucleotides, about 480 nucleotides, about 490 nucleotides, or about 500 nucleotides. The fragmentation analysis may comprise an analysis of fragment-end compositions. For example, the location of where a polynucleotide fragment may be indicative of an origin of the fragment, or of a particular cancer. The nucleic acids may comprise DNA or RNA. The nucleic acids may be cell-free nucleic acids. The fragmentation assay may comprise sequencing as described herein.

The systems and methods provided herein may comprise any suitable protein detection assay (e.g., proteomics). A method may comprise a workflow comprising a protein detection assay. In some embodiments, an assay (e.g., of a workflow) may comprise a protein detection assay. A protein detection assay may comprise obtaining information regarding a proteome obtained or derived from a biological sample of a subject. A first assay of a workflow may comprise a protein detection assay. A second assay of a workflow may comprise a protein detection assay. A protein detection assay may comprise a proteomics assay, an immunoassay, an assay comprising antibody-nucleotide conjugates (e.g., Olink®), or a combination thereof. For example, ELISA kits and multiplex immunoassays may allow for detection and characterization of soluble biomarkers involved with various hallmarks of diseases, e.g., cancer. In some embodiments, the protein detection assay detects one or more proteins expressed in a cancer.

Figure 2:
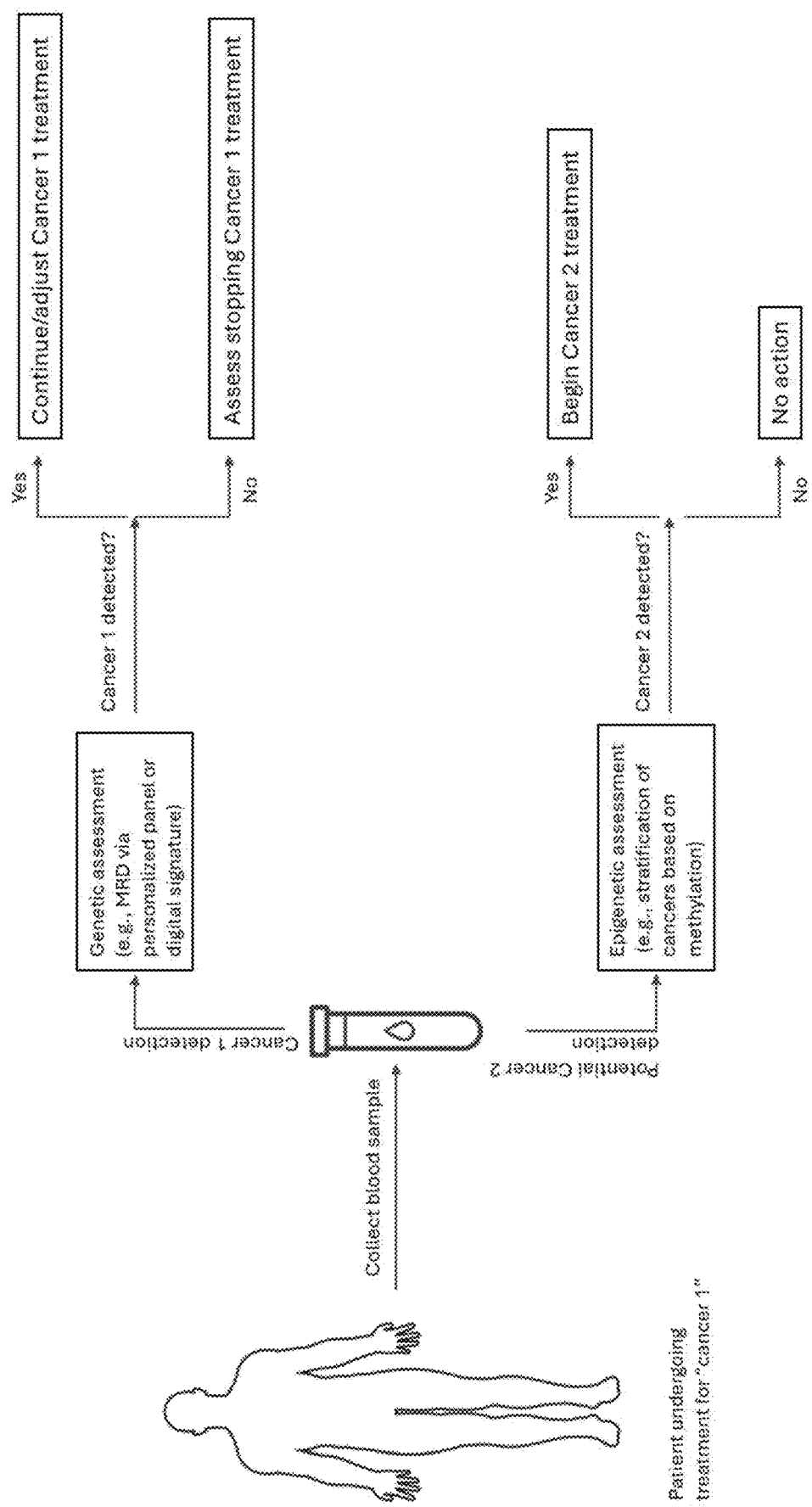
FIG. 2 shows an example of a flowchart illustrating examples of methods and systems described herein.

FIG. 2 shows a flow diagram illustrating an example of the methods and systems described herein. As shown in FIG. 2, a patient is undergoing a treatment for a first primary disease ("cancer 1"). A blood sample is collected from the patient. A genetic assessment is performed on the blood sample of the subject to detect the first primary disease ("cancer 1") in the subject. The genetic assessment may be an MRD assay as described herein. The genetic assessment may be a personalized panel. The genetic assessment may be a digital signature.

Based on a result of the genetic assessment, the first primary disease ("cancer 1") is either detected or not detected. Where the first primary disease ("cancer 1") is detected, a continuation of a treatment for the first primary disease ("cancer 1") is continued and/or adjusted. Where the first primary disease ("cancer 1") is not detected, an assessment for stopping a treatment of the first primary disease ("cancer 1") is performed. Additionally, an epigenetic assessment is performed on the blood sample of the subject to detect a potential second primary disease ("cancer 2"). The epigenetic assessment may include any suitable assay described herein capable of detecting a disease. The epigenetic assessment may include a screening of disease(s) based on methylation. Based on a result of the epigenetic assessment, the potential second primary disease ("cancer 2") is either detected or not detected. Where the second primary disease ("cancer 2") is detected, a treatment for the second primary disease ("cancer 2") is initiated. Where the second primary disease ("cancer 2") is not detected, no action is taken.

Figure 3A:
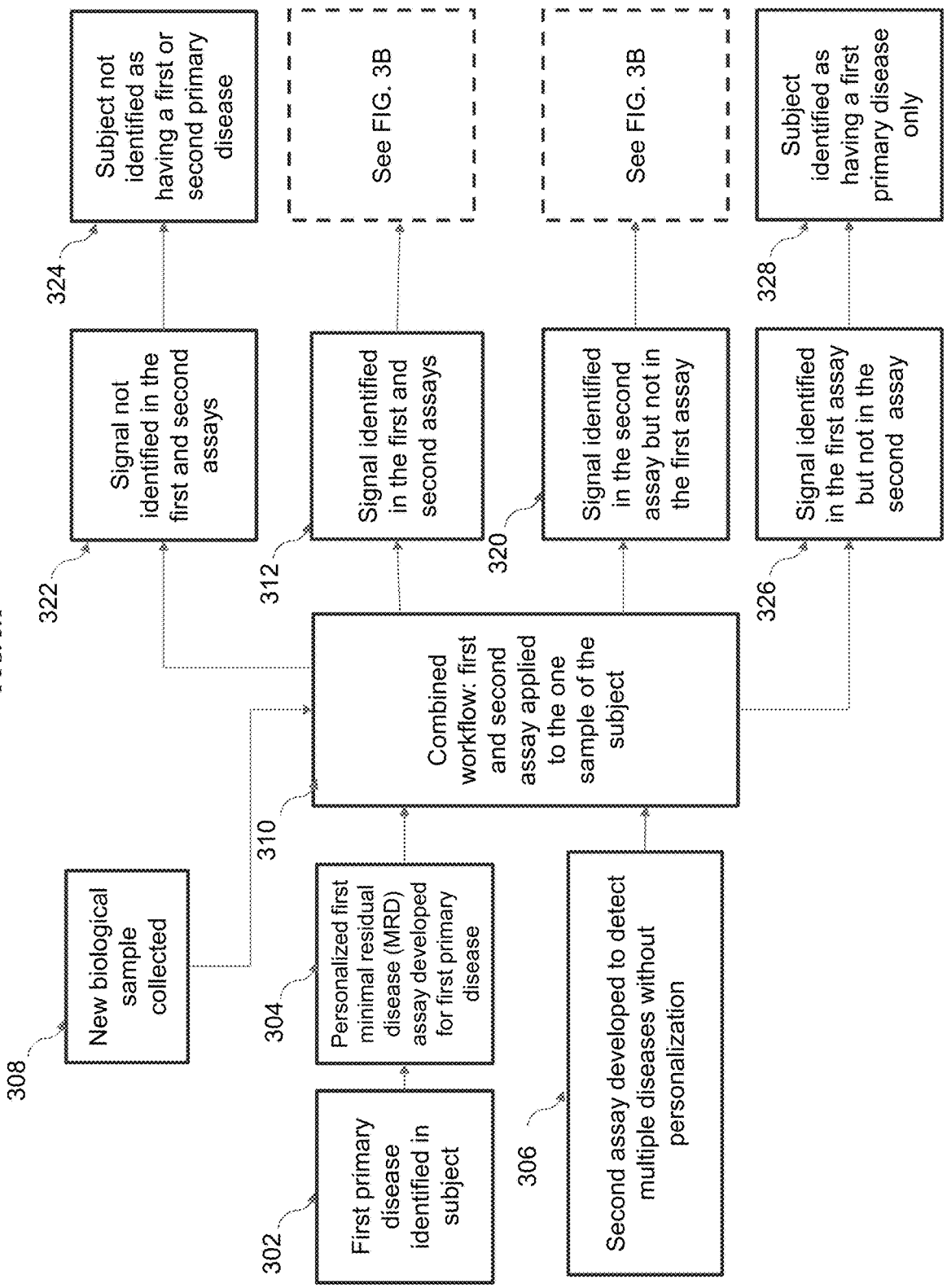
FIGS. 3A and 3B show a flowchart illustrating examples of methods and systems described herein.
Figure 3B:
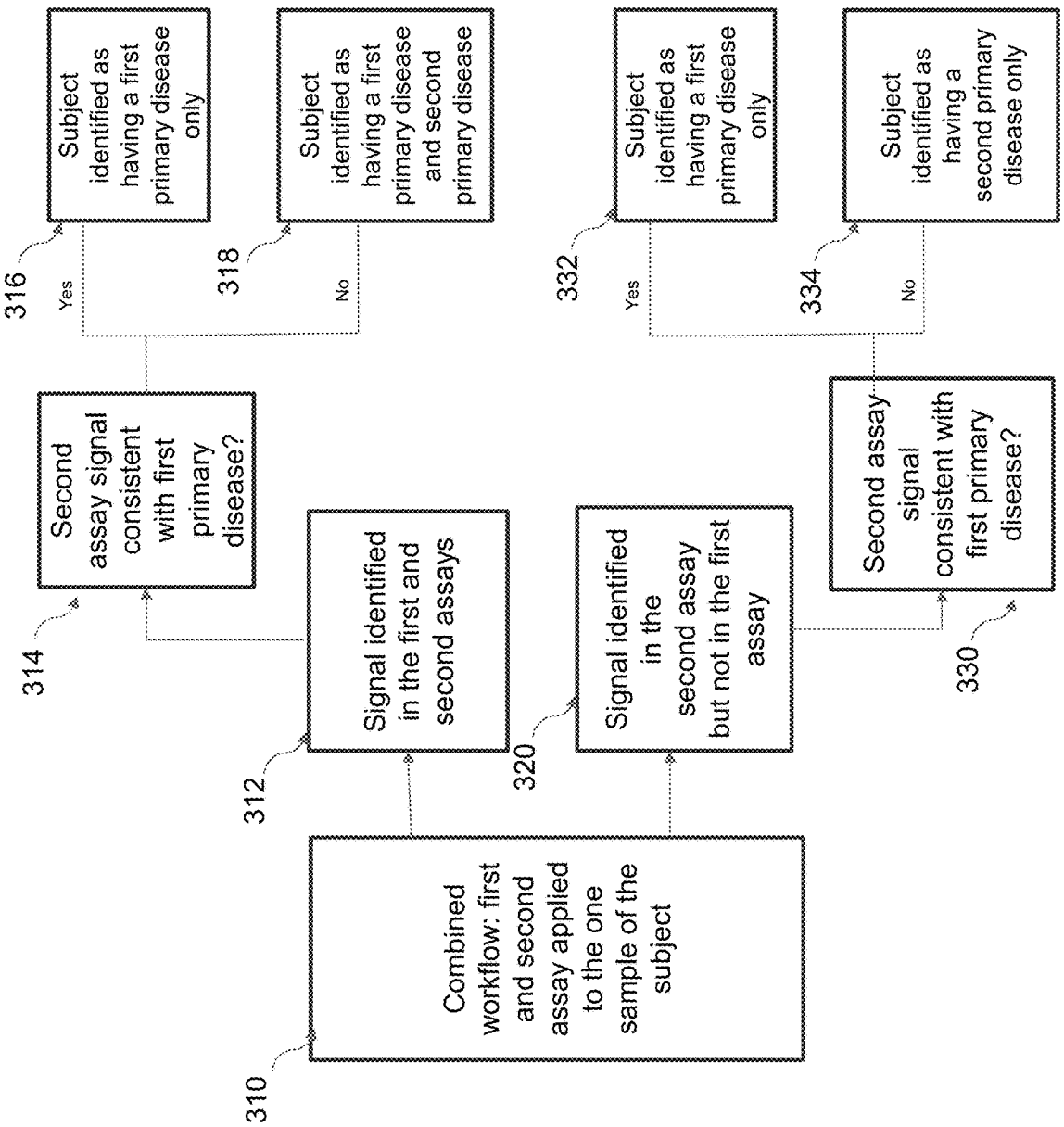

FIGS. 3A and 3B show a flow diagram illustrating examples for detecting a first primary disease, a second primary disease, or both in a subject. FIGS. 3A and 3B shows operations 302, 304, 306, 308, 310, 312, 314, 316, 318, 320, 322, 324, 326, 328, 330, 332, and 334 which are non-limiting.

At operation 302, a first primary disease may be identified in a subject. The first primary disease may be any first primary disease as described herein. The first primary disease may be a cancer. The cancer may be any cancer as described herein.

At operation 304, a first assay may be developed. The first assay may be a personalized first minimal residual disease (MRD) assay which is developed for the first primary disease of operation 302. The personalized first assay may be a MRD assay as described herein. For example, the personalized first MRD assay may be a tumor informed assay. As another example, the personalized first MRD assay may be a personalized sequencing assay, a digital signature assay, or a combination thereof. The personalized sequencing assay, the digital signature assay, or a combination thereof. The personalized first MRD assay may target a plurality of genetic changes or a plurality of epigenetic changes, or a combination thereof, that have previously been identified in a sample of the first primary disease. In one example, the personalized first MRD assay may target a genetic change.

At operation 306, a second assay may be developed to detect (e.g., screen for) multiple diseases. The multiple diseases may comprise more than or equal to 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 diseases. The multiple diseases may be a second primary disease as described herein. The multiple diseases may comprise cancer. The second assay may be developed without personalization. The second assay may be a assay as described herein. For example, the second assay may be a tumor naïve assay. In another example, the second assay may be a tumor informed assay. The second assay may target a genetic change, an epigenetic change, or a combination thereof. In one example, the second assay may target an epigenetic change.

At operation 308, a biological sample may be collected from a subject. The biological sample may be any biological sample described herein. The biological sample may be a blood sample.

At operation 310, the first assay that is personalized of operation 304 and the second assay that is not personalized of operation 306 may be applied to the biological sample collected from the subject of operation 308 in a combined workflow. The first assay and the second assay may be any of the assays described herein. In some embodiments, the first assay is an MRD assay and the second assay may be any of the assays described herein.

At operation 322, a signal may not be identified in either of the first assay or the second assay. At operation 324, it may be interpreted that the lack of signal of 322 indicates that the subject is not identified to have a first primary disease nor a second primary disease.

At operation 326, a signal may be identified in the first assay, but not in the second assay. At operation 328, it may be interpreted that the signal of 326 indicates that the subject may have a first primary disease only (i.e., a second primary disease has not been identified in the subject).

At operation 312, a signal may be identified in the first assay and in the second assay.

At operation 314, the signal of the first assay and the signal of the second assay may be analyzed. An assessment of whether the second assay signal is consistent with the first primary disease may be conducted.

At operation 316, if the second assay signal is consistent with the first primary disease, the subject may be identified as having the first primary disease only.

At operation 318, if the second assay signal is not consistent with the first primary disease, the subject may be identified as having the first primary disease and the second primary disease.

At operation 320, a signal may be identified in the second assay and a signal may not be identified in the first assay.

At operation 330, the signal of the second assay may be analyzed. An assessment of whether the second assay signal is consistent with the first primary disease may be conducted.

At operation 332, if the second assay signal is consistent with the first primary disease, the subject may be identified as having the first primary disease only.

At operation 334, if the second assay signal is not consistent with the first primary disease, the subject may be identified as having the second primary disease only.

In some embodiments, the methods may comprise processing a result of an assay. The processing may use a trained machine learning algorithm. The trained machine learning algorithm may comprise any machine learning algorithm described herein. The trained machine learning algorithm may comprise a deep learning classifier, a neural network classifier, a linear discriminant analysis (LDA) classifier, a random forest (RF) classifier, a naive Bayes algorithm classifier, a decision tree, a gradient boosting classifier, a support vector machine, a genetic algorithm, an individual component analysis (ICA), a singular value decomposition (SVD), a factor analysis classifier, a principal component analysis (PCA) classifier, or a combination thereof. The trained machine learning algorithm may comprise a deep learning classifier. The trained machine learning algorithm may comprise a neural network classifier. The trained machine learning algorithm may comprise a linear discriminant analysis (LDA) classifier. The trained machine learning algorithm may comprise a random forest (RF) classifier. The trained machine learning algorithm may comprise a naive Bayes algorithm classifier. The trained machine learning algorithm may comprise a decision tree. The trained machine learning algorithm may comprise a gradient boosting classifier. The trained machine learning algorithm may comprise a support vector machine. The trained machine learning algorithm may comprise a genetic algorithm. The trained machine learning algorithm may comprise an individual component analysis (ICA). The trained machine learning algorithm may comprise a singular value decomposition (SVD). The trained machine learning algorithm may comprise a factor analysis classifier. The trained machine learning algorithm may comprise a principal component analysis (PCA) classifier.

In some embodiments, the methods may comprise processing a result of an assay using a trained regression method. The trained regression method may comprise a linear regression method, a logistic regression method, a polynomial regression method, a ridge regression method, or a combination thereof. The trained regression method may comprise a linear regression method. The trained regression method may comprise a logistic regression method. The trained regression method may comprise a polynomial regression method. The trained regression method may comprise a ridge regression method.

In some embodiments, the methods may comprise analyzing (e.g., quantifying) sequence reads of a result of an assay at a plurality of genomic loci. The plurality of genomic loci may comprise more than or equal to about 3, about 4, about 5, about 10, about 15, about 20, about 25, about 30, about 35, about 40, about 50, about 100, about 200, about 300, about 400, about 500, about 750, about 1,000, about 2,000, about 3,000, about 4,000, about 5,000, about 6,000, about 7,000, about 8,000, about 9,000, about 10,000, about 15,000, about 20,000, about 25,000, about 35,000, about 45,000, or about 50,000 genomic loci.

The methods may comprise use of a first assay and a second assay. The first assay and the second assay may be different assays. The first assay and the second assay may be different assays, and respective signals from the first assay and second assay may be analyzed differently to determine presence or absence of first primary disease and presence or absence of second primary disease. The first assay and the second assay may be the same assay. The first assay and the second assay may be the same assay, and signals from the same assay may be analyzed two separate ways to determine presence or absence of first primary disease and presence or absence of second primary disease.

In some embodiments, the methods may comprise performing a first analysis on a result of the first assay. In some embodiments, the methods may comprise performing a second analysis on a result of the second assay. The methods may comprise performing a first analysis on a result of the first assay and performing a second analysis on a result of the second assay.

The methods may comprise performing a first analysis on a first result of the workflow (e.g., result of a first assay) and performing a second analysis on a second result of the workflow (e.g., result of a second assay). The methods may comprise performing a first analysis and a second analysis on a result of a workflow. For example, a workflow may comprise a digital signature assay and the result of the digital signature assay may be analyzed first in a tumor-informed manner to determine presence or absence of a first primary disease and the result of the digital signature assay may be analyzed a second time in a tumor-naïve manner to determine presence or absence of a second primary disease.

In some embodiments, a workflow provided may comprise a single assay. In some embodiments, the single assay is capable of detecting the presence or absence of a first primary disease and the presence or absence of a second primary disease. In some embodiments, the methods may comprise performing a first analysis on a result of an assay. In some embodiments, the methods may further comprise performing a second analysis on a result of the assay. A result may comprise data obtained from the assay. In some embodiments the assay is capable of providing both genetic and epigenetic information about the biological sample. In some embodiments, the data provided by the assay may be analyzed in a tumor-informed manner for the first analysis (e.g., determining presence or absence of a SNV), then analyzed in a tumor-naïve manner for the second analysis (e.g., epigenetics analysis). In some embodiments, the data provided by the assay may be analyzed to determine the presence or absence of a genetic biomarker, then analyzed in to determine the presence or absence of an epigenetic biomarker for the second analysis. In some embodiments, the first analysis is performed to determine the presence or absence of a first primary disease, and the second analysis is performed to determine the presence or absence of a second primary disease. The assay may be the first assay or the second assay, as described herein. In such embodiments, the first assay and the second assay are the same assay. For example, a workflow may comprise a digital signature assay and the result of the digital signature assay may be analyzed first in a tumor-informed manner to determine presence or absence of a first primary disease and the result of the digital signature assay may be analyzed a second time in a tumor-naïve manner to determine presence or absence of a second primary disease.

In some embodiments, a workflow may comprise a single assay. The single assay may be analyzed in one or more ways (e.g., a first analysis and a second analysis). In some embodiments, the methods provided herein may comprise one or more assays (e.g., a first assay and a second assay). The one or more assays may be analyzed in one or more ways (e.g., first analysis and second analysis). The first analysis and the second analysis may be different. In some embodiments, the first analysis comprises tumor-informed data and the second analysis comprises tumor-naïve data. In some embodiments, first analysis comprises tumor-naïve data and the second analysis comprises tumor-informed data. The tumor naïve data may comprise fragmentomics data, mutational profile data, epigenetics data, or a combination thereof. The tumor naïve data may comprise fragmentomics data. The tumor naïve data may comprise mutational profile data. The tumor naïve data may comprise epigenetics data. The tumor naïve data may comprise at least two of the fragmentomics data, the mutational profile data, and the epigenetics data. The tumor naïve data may comprise the fragmentomics data and the mutational profile data. The tumor naïve data may comprise the fragmentomics data and the epigenetics data. The tumor naïve data may comprise the mutational profile data and the epigenetics data. In some embodiments, the first analysis comprises genetic data and the second analysis comprises epigenetic data. In some embodiments, the first analysis comprises epigenetic data and the second analysis comprises genetic data. For example, a workflow may comprise a digital signature assay and the result of the digital signature assay may be analyzed first in a tumor-informed manner to determine presence or absence of a first primary disease and the result of the digital signature assay may be analyzed a second time in a tumor-naïve manner to determine presence or absence of a second primary disease.

A workflow may comprise a first assay and a second assay. A first assay may comprise a first analysis. A second assay may comprise a second analysis. In some embodiments, the first analysis is performed to assess if a first primary disease is present in the subject and the second analysis is performed to assess if a second primary disease is present in the subject. In some embodiments, the first analysis is performed to assess if a first primary disease and a second primary diseases is present in the subject. In some embodiments, the first analysis is performed to assess if a first primary disease is present in the subject. In some embodiments, the first analysis is performed to assess if a second primary disease is present in the subject. In some embodiments, the second analysis is performed to assess if a first primary disease is present in the subject and the first analysis is performed to assess if a second primary disease is present in the subject. In some embodiments, the second analysis is performed to assess if a first primary disease and a second primary disease is present in the subject. In some embodiments, the second analysis is performed to assess if a second primary disease is present in the subject.

A workflow may comprise a first assay and a second assay. A first assay may comprise a first analysis. A second assay may comprise a second analysis. In some embodiments, the first analysis and the second analysis are performed on the same data. The first analysis and the second analysis may be performed on tumor naïve data. The first analysis and the second analysis may be performed tumor informed data. The first analysis and the second analysis may be performed on genetic data. The first analysis and the second analysis may be performed on epigenetic data. In some embodiments, the first analysis and the second analysis are performed on different features or measurements of the same data. The first analysis may be performed on tumor informed data and the second analysis may be performed on tumor naïve data. The first analysis may be performed on tumor naïve data and the second analysis may be performed on tumor informed data. The first analysis may be performed on genetic data and the second analysis may be performed on epigenetic data. The first analysis may be performed on epigenetic data and the second analysis may be performed on genetic data. In some embodiments, the first assay and the second assay are the same assay (e.g., each is the same assay or a single assay is analyzed twice).

In some embodiments, the methods may comprise determining a first signal in the first assay (e.g., of a workflow). Determining the first signal may comprise estimating a likelihood of the first signal. The methods may comprise estimating a likelihood of the first signal with an accuracy of at least 50%, 55%, 60%, 65%, 70%, 75%, 80%, 85%, 90%, 95%, 96%, 97%, 98%, or 99%. The first signal may be attributed to one or more biomarkers, for example, two or more, three or more, four or more, five or more, 10 or more, 25 or more, 50 or more, 100 or more, 250 or more, or 500 or more biomarkers. The first signal may comprise a circulating tumor cell marker signal, a circulating tumor DNA marker signal, a DNA marker signal, a RNA marker signal, a histone marker signal, a DNA binding factor marker signal (e.g., transcription factor signal, insulator signal, or the like), a nucleosome positioning marker signal, a chromosome accessibility marker signal, or a combination thereof. The first signal may comprise a DNA methylation signal. The first signal may comprise a fragmentation signal. The first signal may comprise a DNA methylation and a fragmentation signal.

In some embodiments, the methods may comprise determining a second signal in the second assay (e.g., of a workflow). Determining the second signal may comprise estimating a likelihood of the second signal. The methods may comprise estimating a likelihood of the second signal with an accuracy of at least 50%, 55%, 60%, 65%, 70%, 75%, 80%, 85%, 90%, 95%, 96%, 97%, 98%, or 99%. The second signal may be attributed to one or more biomarkers, for example, two or more, three or more, four or more, five or more, 10 or more, 25 or more, 50 or more, 100 or more, 250 or more, or 500 or more biomarkers. The second signal may comprise a circulating tumor cell marker signal, a circulating tumor DNA marker signal, a DNA marker signal, a RNA marker signal, a histone marker signal, a DNA binding factor marker signal (e.g., a transcription factor signal, an insulator signal, or the like), a nucleosome positioning marker signal, a chromosome accessibility marker signal, or a combination thereof.

The second assay (e.g., of a workflow) may be configured to assess one or more additional diseases in the subject. For example, the second assay may be configured without personalization of the subject. In some embodiments, the second assay may asses more than or equal to about 1, about 2, about 3, about 4, about 5, about 6, about 7, about 8, about 9, about 10, about 15, about 20, about 25, about 30, about 35, about 40, about 45, about 50, about 60, about 70, about 80, about 90, about 100, about 125, about 150, about 175, about 200, about 250, about 300, about 350, about 400, about 450, about 500, about 600, about 700, about 800, about 900, about 1,000, about 1,100, about 1,200, about 1,300, about 1,400, about 1,500, about 1,600, about 1,700, about 1,800, about 1,900, about 2,000 or about 2,500 additional diseases. The second signal may comprise a DNA methylation signal. The second signal may comprise a fragmentation signal. The second signal may comprise a DNA methylation signal and a fragmentation signal. The second signal may comprise a proteomics signal.

The methods provided herein may comprise determining a first signal in the first assay and a second signal in the second assay of a workflow. The first assay may be applied to a biological sample of a subject. The second assay may be applied to the biological sample of the subject. The first assay and the second assay may be applied to the biological sample of the subject. The biological sample of the subject may comprise a single biological sample. For example, the first assay and the second assay may be applied to the same biological sample of a subject.

The methods provided herein may comprise comparing the first signal in the first assay and the second signal in the second assay of a workflow. The comparing may comprise determining a likelihood of a presence or an absence of a first primary disease in the subject. The comparing may comprise determining a likelihood of a presence or an absence of a first primary disease and a second primary disease in the subject. The comparing may comprise determining a likelihood of a presence or an absence of a first primary disease, a second primary disease, and an additional primary disease in the subject. The comparing may comprise determining a likelihood of a presence or an absence of a second primary disease in the subject. The comparing may comprise determining a likelihood of a presence or an absence of a second primary disease and an additional primary disease in the subject. The comparing may comprise determining a likelihood of a presence or an absence of an additional primary disease in the subject.

The methods provided herein may comprise determining a second signal in the second assay and determining a first signal in the first assay of a workflow. The methods may comprise determining a second signal in the second assay and not determining a first signal in the first assay. The methods may comprise determining a first signal in the first assay and not determining a second signal in the second assay. The methods may comprise not determining a signal in the first assay and not determining a signal in the second assay.

In some embodiments, the methods may comprise determining the presence a second signal attributed to a second primary disease in the second assay and not identifying the presence of a first signal attributed to a first primary disease in the first assay. The methods may comprise determining that the subject comprises the second primary disease and not the first primary disease. In some embodiments, a second signal detected in the second assay may be attributed to a first primary disease.

In some embodiments, the methods may comprise determining the presence of a first signal attributed to a first primary disease in the first assay and not identifying the presence of a second signal attributed to a second primary disease in the second assay. The methods may comprise determining that the subject comprises the first primary disease and not the second primary disease.

In some embodiments, the methods may comprise determining the presence of a first signal attributed to a first primary disease in the first assay and identifying the presence of a second signal attributed to a second primary disease in the second assay. The methods may comprise determining that the subject comprises the first primary disease and the second primary disease.

The methods may comprise detecting a primary disease of a subject. The primary disease may comprise a first primary disease, a second primary disease, or one or more additional primary diseases.

In some embodiments, the primary disease (e.g., the first primary disease, the second primary disease, or the one or more additional diseases) comprise a cancer. The first primary disease may be a cancer. The second primary disease may be a cancer. The cancer may comprise adrenal gland cancer, kidney cancer, aerodigestive tract cancer, biliary tract cancer, breast cancer, liver cancer, ovarian cancer, lung cancer, leukemia, lymphoma, salivary gland cancer, renal cancer, bladder cancer, brain cancer, head and neck cancer, prostate cancer, skin cancer, pancreatic cancer, cervical cancer, colorectal cancer, testicular cancer, thyroid cancer, bile duct cancer, central nervous system cancer, or esophageal cancer. The cancer may comprise a stage of a cancer, for example, stage 0 cancer, stage I cancer, stage II cancer, stage III cancer, or stage IV cancer.

In some embodiments, the primary disease (e.g., the first primary disease, the second primary disease, or the one or more additional diseases) is a precancer. The precancer may comprise adenomas, hyperplasias, metaplasias, dysplasias, benign neoplasias (benign tumors), premalignant carcinoma in situ, or polyps. It should be noted that certain types of carcinoma in-situ are recognized in the field as cancerous, e.g., Stage 0 cancer, as opposed to premalignant.

In some embodiments, the second primary disease and the first primary disease are the same. In some embodiments, the second primary disease and the first primary disease are different. In some embodiments, the second primary disease is a derivative of the first primary disease.

In some embodiments, the first primary disease comprises a tumor. The tumor may comprise one or more tumors. For example, the tumor may comprise more than or equal to 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 tumors.

In some embodiments, the second primary disease comprises a tumor. The tumor may comprise one or more tumors. For example, the tumor may comprise more than or equal to 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 tumors.

In some embodiments, the first primary disease comprises a first tumor and the second primary disease comprises a second tumor. In some embodiments, the first tumor and the second tumor are the same. In some embodiments, the first tumor and the second tumor are different. In some embodiments, the first tumor and the second tumor are genetically distinct. In some embodiments, the first tumor is a benign tumor. In some embodiments, the first tumor is a malignant tumor. In some embodiments, the first tumor is a metastasized tumor. In some embodiments, the first tumor is not a metastasized tumor. In some embodiments, the second tumor is a benign tumor. In some embodiments, the second tumor is a malignant tumor. In some embodiments, the second tumor is a metastasized tumor. In some embodiments, the second tumor is not a metastasized tumor.

In some embodiments, the primary disease (e.g., the first primary disease, the second primary disease, or the one or more additional diseases) comprises a hematologic disease, acute lymphoblastic leukemia (ALL), acute myeloid leukemia (AML), acute promyelocytic leukemia (APL), anaplastic large cell lymphoma (ALCL), Burkitt lymphoma, chronic lymphocytic leukemia (CLL), chronic myeloid leukemia (CML), diffuse large B-cell lymphoma (DLBCL), eosinophilia, follicular lymphoma, hairy cell leukemia (HCL), Hodgkin lymphoma, large granular lymphocytic leukemia (LGL), MALT lymphoma, mantle cell lymphoma (MCL), marginal zone B-cell lymphoma (MZL), Mastocytosis, myelodysplastic syndrome (MDS), myeloproliferative neoplasm (MPN), non-Hodgkin lymphoma (NHL), plasma cell myeloma, PNH, t-cell lymphoma, or Waldenstrom macroglobulinemia.

In some embodiments, the primary disease (e.g., the first primary disease, the second primary disease, or the one or more additional diseases) comprises a disease of an organ. The primary disease may be kidney disease, brain disease, skin disease, gallbladder disease, lung disease, liver disease, spleen disease, pancreas disease, bladder disease, thymus disease, heart disease, stomach disease, bone disease, or reproductive system disease. The disease may comprise a disease of a tissue. The primary disease may be a disease of the connective tissue, epithelial tissue, muscle tissue, or nervous tissue.

In some embodiments, the primary disease (e.g., the first primary disease, the second primary disease, or the one or more additional diseases) comprises diabetes, cirrhosis, stroke, Alzheimer's disease, tuberculosis, coronary artery disease, or chronic obstructive pulmonary disease.

In some embodiments, a workflow may comprise a first assay, a second assay, and a third assay. The first assay, the second assay, and the third assay may be the same. The first assay, the second assay, and the third assay may be different. In some embodiments, at least two of the first assay, second assay, or third assay are the same, while one is different.

In some embodiments, a workflow may comprise a first assay, a second assay, a third assay, and a fourth assay. The first assay, the second assay, the third assay, and the fourth assay may be the same. The first assay, the second assay, the third assay, and the fourth assay may be different. At least two of the first assay, the second assay, the third assay, and the fourth assay may be the same. At least three of the first assay, the second assay, the third assay, and the fourth assay may be the same.

In some embodiments, a workflow may comprise a first assay, a second assay, a third assay, a fourth assay, and a fifth assay. The first assay, the second assay, the third assay, the fourth assay, and the fifth assay may be the same. The first assay, the second assay, the third assay, the fourth assay, and the fifth assay may be different. At least two of the first assay, the second assay, the third assay, the fourth assay, and the fifth assay may be the same. At least three of the first assay, the second assay, the third assay, the fourth assay, and the fifth assay may be the same. At least four of the first assay, the second assay, the third assay, the fourth assay, and the fifth assay may be the same.

The systems and methods provided herein may comprise detecting a primary disease in a subject. The primary disease may be a second primary disease.

In some embodiments, the second primary disease of the subject is detected with an accuracy of at least 50%, 55%, 60%, 65%, 70%, 75%, 80%, 85%, 90%, 95%, 96%, 97%, 98%, or 99%.

In some embodiments, the second primary disease of the subject is detected with a sensitivity of at least 50%, 55%, 60%, 65%, 70%, 75%, 80%, 85%, 90%, 95%, 96%, 97%, 98%, or 99%.

In some embodiments, the second primary disease of the subject is detected with a specificity of at least 50%, 55%, 60%, 65%, 70%, 75%, 80%, 85%, 90%, 95%, 96%, 97%, 98%, or 99%.

In some embodiments, the second primary disease of the subject is detected with a positive predictive value (PPV) of at least 50%, 55%, 60%, 65%, 70%, 75%, 80%, 85%, 90%, 95%, 96%, 97%, 98%, or 99%.

In some embodiments, the second primary disease of the subject is detected with a negative predictive value (NPV) of at least 50%, 55%, 60%, 65%, 70%, 75%, 80%, 85%, 90%, 95%, 96%, 97%, 98%, or 99%.

In some embodiments, the second primary disease of the subject is detected with an Area Under the Curve (AUC) of a Receiver Operating Characteristic (ROC) of at least 0.50, 0.55, 0.60, 0.65, 0.70, 0.75, 0.80, 0.85, 0.90, 0.95, 0.96, 0.97, 0.98, or 0.99.

The systems and methods provided herein may comprise detecting a primary disease in a subject. The primary disease may be a first primary disease.

In some embodiments, the first primary disease of the subject is detected with an accuracy of at least 50%, 55%, 60%, 65%, 70%, 75%, 80%, 85%, 90%, 95%, 96%, 97%, 98%, or 99%.

In some embodiments, the first primary disease of the subject is detected with a sensitivity of at least 50%, 55%, 60%, 65%, 70%, 75%, 80%, 85%, 90%, 95%, 96%, 97%, 98%, or 99%.

In some embodiments, the first primary disease of the subject is detected with a specificity of at least 50%, 55%, 60%, 65%, 70%, 75%, 80%, 85%, 90%, 95%, 96%, 97%, 98%, or 99%.

In some embodiments, the first primary disease of the subject is detected with a positive predictive value (PPV) of at least 50%, 55%, 60%, 65%, 70%, 75%, 80%, 85%, 90%, 95%, 96%, 97%, 98%, or 99%.

In some embodiments, the first primary disease of the subject is detected with a negative predictive value (NPV) of at least 50%, 55%, 60%, 65%, 70%, 75%, 80%, 85%, 90%, 95%, 96%, 97%, 98%, or 99%.

In some embodiments, the first primary disease of the subject is detected with an Area Under the Curve (AUC) of a Receiver Operating Characteristic (ROC) of at least 0.50, 0.55, 0.60, 0.65, 0.70, 0.75, 0.80, 0.85, 0.90, 0.95, 0.96, 0.97, 0.98, or 0.99.

The systems and methods provided herein may comprise detecting a presence or an absence of one or more additional diseases in a subject. In some embodiments, the methods may comprise using a result of an assay disclosed herein. The result of the assay may be used to detect a presence or an absence of one or more additional diseases of a subject. The assay may be a part of a workflow comprising one or more assays.

In some embodiments, the methods may comprise detecting one or more additional diseases in a subject. In some embodiments, the methods may comprise detecting more than or equal to 1, 2, 3, 4, 5, 6, 7, 8, 9, 10, 11, 12, 13, 14, 15, 16, 17, 18, 19, 20, 21, 22, 23, 24, 25, 30, 35, 40, 45, 50, 55, 60, 65, 70, 75, 80, 85, 90, 95, or 100 additional diseases. In some embodiments, the methods may comprise detecting less than or equal to 100, 95, 90, 85, 80, 75, 70, 65, 60, 55, 50, 45, 40, 35, 30, 25, 24, 23, 22, 21, 20, 19, 18, 17, 16, 15, 14, 13, 12, 11, 10, 9, 8, 7, 6, 5, 4, 3, or 2 additional diseases. In some embodiments, the methods comprise detecting 1 to about 10 additional diseases in a subject. In some embodiments, the methods comprise detecting 1 to about 5 additional diseases in a subject. In some embodiments, the methods comprise detecting 1 to 3 additional diseases in a subject. In some embodiments, the methods comprise detecting 1 to 2 additional diseases in a subject. In some embodiments, the methods comprise detecting 1 additional disease in a subject.

In some embodiments, the one or more additional diseases may comprise at least 1 additional disease, at least 2 additional diseases, at least 3 additional diseases, at least 4 additional diseases, at least 5 additional diseases, at least 6 additional diseases, at least 7 additional diseases, at least 8 additional diseases, at least 9 additional diseases, at least 10 additional diseases, at least 11 additional diseases, at least 12 additional diseases, at least 13 additional diseases, at least 14 additional diseases, at least 15 additional diseases, at least 16 additional diseases, at least 17 additional diseases, at least 18 additional diseases, at least 19 additional diseases, at least 20 additional diseases, at least 21 additional diseases, at least 22 additional diseases, at least 23 additional diseases, at least 24 additional diseases, at least 25 additional diseases, at least 30 additional diseases, at least 35 additional diseases, at least 40 additional diseases, at least 45 additional diseases, at least 50 additional diseases, at least 55 additional diseases, or at least 60 additional diseases. In some embodiments, the one or more additional diseases may comprise at most 60 additional diseases, at most 55 additional diseases, at most 50 additional diseases, at most 45 additional diseases, at most 40 additional diseases, at most 35 additional diseases, at most 30 additional diseases, at most 25 additional diseases, at most 24 additional diseases, at most 23 additional diseases, at most 22 additional diseases, at most 21 additional diseases, at most 20 additional diseases, at most 19 additional diseases, at most 18 additional diseases, at most 17 additional diseases, at most 16 additional diseases, at most 15 additional diseases, at most 14 additional diseases, at most 13 additional diseases, at most 12 additional diseases, at most 11 additional diseases, at most 10 additional diseases, at most 9 additional diseases, at most 8 additional diseases, at most 7 additional diseases, at most 6 additional diseases, at most 5 additional diseases, at most 4 additional diseases, at most 3 additional diseases, at most 2 additional diseases, or at most 1 additional disease.

In some embodiments, each of the one or more additional diseases are the same. In some embodiments, each of the one or more additional diseases are different from each other. In some embodiments, some of the one or more additional diseases are the same and some of the one or more additional diseases are different from each other.

In some embodiments, the one or more additional diseases of the subject is detected with an accuracy of at least 50%, 55%, 60%, 65%, 70%, 75%, 80%, 85%, 90%, 95%, 96%, 97%, 98%, or 99%.

In some embodiments, the one or more additional diseases of the subject is detected with a sensitivity of at least 50%, 55%, 60%, 65%, 70%, 75%, 80%, 85%, 90%, 95%, 96%, 97%, 98%, or 99%.

In some embodiments, the one or more additional diseases of the subject is detected with a specificity of at least 50%, 55%, 60%, 65%, 70%, 75%, 80%, 85%, 90%, 95%, 96%, 97%, 98%, or 99%.

In some embodiments, the one or more additional diseases of the subject is detected with a positive predictive value (PPV) of at least 50%, 55%, 60%, 65%, 70%, 75%, 80%, 85%, 90%, 95%, 96%, 97%, 98%, or 99%.

In some embodiments, the one or more additional diseases of the subject is detected with a negative predictive value (NPV) of at least 50%, 55%, 60%, 65%, 70%, 75%, 80%, 85%, 90%, 95%, 96%, 97%, 98%, or 99%.

In some embodiments, the one or more additional diseases of the subject is detected with an Area Under the Curve (AUC) of a Receiver Operating Characteristic (ROC) of at least 0.50, 0.55, 0.60, 0.65, 0.70, 0.75, 0.80, 0.85, 0.90, 0.95, 0.96, 0.97, 0.98, or 0.99.

In another aspect, provided herein is a method of treating a subject having a second primary disease. In some embodiments, the subject has second primary disease and a first primary disease. The second primary disease, first primary disease, or both, may be detected in the subject using any of the methods described herein.

In another aspect, provided herein is a method of detecting a second primary disease for use in treating a subject who is found to have the second primary disease. In some embodiments, the subject has the second primary disease and a first primary disease. The second primary disease, first primary disease, or both, may be detected in the subject using any of the methods described herein.

In another aspect, provided herein is a method of detecting a second primary disease for use in developing a treatment plan for a subject who is found to have the second primary disease. In some embodiments, the subject has the second primary disease and a first primary disease. The second primary disease, first primary disease, or both, may be detected in the subject using any of the methods described herein. In some embodiments, the treatment may comprise chemotherapy, radiation therapy, surgical resection, targeted therapy, immunotherapy, or a combination thereof. The treatment may comprise chemotherapy. The treatment may comprise radiation therapy. The treatment may comprise surgical resection. The treatment may comprise targeted therapy. The treatment may comprise immunotherapy.

Any of the methods provided herein may comprise administering a treatment to a subject. In some embodiments, the treatment may comprise chemotherapy, radiation therapy, surgical resection, targeted therapy, immunotherapy, or a combination thereof. The treatment may comprise chemotherapy. The treatment may comprise radiation therapy. The treatment may comprise surgical resection. The treatment may comprise targeted therapy. The treatment may comprise immunotherapy.

The treatment may comprise one or more treatments. For example, the treatment may comprise about 1, about 2, about 3, about 4, about 5, about 6, about 7, about 8, about 9, about 10, about 11, about 12, about 13, about 14, about 15, about 16, about 17, about 18, about 19, or about 20 treatments. The one or more treatments may be the same. The one or more treatments may be different. The one or more treatments may be administered at various time points, or at the same time point.

In some embodiments, the treatment may be for treating a first primary disease, a second primary disease, or a combination thereof. In some embodiments, the treatment may be for treating a first primary disease. In some embodiments, the treatment may be for treating a second primary disease. In some embodiments, the treatment may be for treating a first primary disease and a second primary disease. In some embodiment, the treatment may be for treating a first primary disease, a second primary disease, and one or more additional diseases. In some embodiments, the treatment may be for treating one or more additional diseases.

The methods provided herein may comprise monitoring a subject for a primary disease. The primary disease may be a first primary disease, a second primary disease, or one or more additional diseases.

Systems

Provided herein are systems comprising one or more processors and a memory operatively coupled to the one or more processors. The one or more processors may be individually or collectively programmed to perform any one of the methods described herein.

In some embodiments, the one or more processors may be individually or collectively programmed to perform a method, the method comprising: (a) performing a minimal residual disease (MRD) assay on a biological sample obtained or derived from the subject, wherein the subject has been previously diagnosed with a first primary disease; and (b) using a result of the MRD assay to detect the presence or the absence of the second primary disease in the subject.

Computer Systems and Machine Learning

A. Data Analysis

In some embodiments, the present disclosure provides systems, methods, or kits having data analysis realized in software applications, computing hardware, or both. In various embodiments, the analysis applications or systems comprises at least a data receiving module, a data pre-processing module, a data analysis module, a data interpretation module, a data visualization module, or a combination thereof. In some embodiments, the data receiving module can comprise computer systems that can connect laboratory hardware or instrumentation with computer systems that process laboratory data. In some embodiments, the data pre-processing module can comprise hardware systems or computer software that can perform operations on the data in preparation for analysis. Non-limiting examples of operations that can be applied to the data in the pre-processing module include affine transformations, denoising operations, data cleaning, reformatting, or subsampling. A data analysis module, which can be specialized for analyzing data from one or more materials, can, for example, take assembled sequences and perform probabilistic and statistical analysis to identify abnormal patterns related to a disease or condition. A data interpretation module can use analysis methods, for example, drawn from statistics, mathematics, or biology, or the like, to support understanding of the relation between the identified abnormal patterns or health conditions/diseases. A data visualization module can use methods of mathematical modeling, computer graphics, or rendering to create visual representations of data that can facilitate the understanding or interpretation of results.

In some embodiments, machine learning methods may be applied to distinguish samples in a population of samples.

In some embodiment, the machine learning operations used to train a prediction engine may include one or more of: a generalized linear model, a generalized additive model, a non-parametric regression operation, a random forest classifier, a spatial regression operation, a Bayesian regression model, a time series analysis, a Bayesian network, a Gaussian network, a decision tree learning operation, an artificial neural network, a recurrent neural network, a reinforcement learning operation, linear/non-linear regression operations, a support vector machine, a clustering operation, and a genetic algorithm operation.

In some embodiments, computer processing methods may be selected from logistic regression, multiple linear regression (MLR), dimension reduction, partial least squares (PLS) regression, principal component regression, autoencoders, variational autoencoders, singular value decomposition, Fourier bases, wavelets, discriminant analysis, support vector machine, decision tree, classification and regression trees (CART), tree-based methods, random forest, gradient boost tree, logistic regression, matrix factorization, multidimensional scaling (MDS), dimensionality reduction methods, t-distributed stochastic neighbor embedding (t-SNE), multilayer perceptron (MLP), network clustering, neuro-fuzzy, and artificial neural networks.

In some embodiments, the methods disclosed herein can include computational analysis on sequencing data of samples from a subject or from a plurality of subjects. An analysis can identify a variant inferred from sequence data to identify sequence variants based on probabilistic modeling, statistical modeling, mechanistic modeling, network modeling, or statistical inferences. Non-limiting examples of analysis methods include principal component analysis (PCA), autoencoders, singular value decomposition, Fourier bases, wavelets, discriminant analysis, regression, support vector machines, tree-based methods, networks, matrix factorization, and clustering.

B. Classifier Generation

In some embodiments, the present systems and methods provide a classifier generated based on feature information. The classifier may form part of a predictive engine for distinguishing groups in a population based features identified in biological samples described herein.

In some embodiments, a classifier is created by normalizing information by formatting similar portions of the information into a unified format and a unified scale; storing the normalized information in a columnar database; training a prediction engine by applying one or more one machine learning operations to the stored normalized information, the prediction engine mapping, for a particular population, a combination of one or more features; applying the prediction engine to the accessed field information to identify associations with a group; and classifying a subject into a group.

In some embodiments, the model, classifier, or predictive test has a specificity of at least about 40%, at least about 45%, at least about 50%, at least about 55%, at least about 60%, at least about 65%, at least about 70%, at least about 75%, at least about 80%, at least about 85%, at least about 90%, at least about 91%, at least about 92%, at least about 93%, at least about 94%, at least about 95%, at least about 97%, at least about 98%, or at least about 99%.

In some embodiments, the model, classifier, or predictive test has a sensitivity of at least about 40%, at least about 45%, at least about 50%, at least about 55%, at least about 60%, at least about 65%, at least about 70%, at least about 75%, at least about 80%, at least about 85%, at least about 90%, at least about 91%, at least about 92%, at least about 93%, at least about 94%, at least about 95%, at least about 97%, at least about 98%, or at least about 99%.

C. Digital Processing Device

In some embodiments, the subject matter described herein can include a digital processing device or use of the same. In some embodiments, the digital processing device can include one or more hardware central processing units (CPU), graphics processing units (GPU), or tensor processing units (TPU) that carry out the device's functions. In some embodiments, the digital processing device can include an operating system configured to perform executable instructions. In some embodiments, the digital processing device can optionally be connected a computer network. In some embodiments, the digital processing device can be optionally connected to the Internet such that it accesses the World Wide Web. In some embodiments, the digital processing device can be optionally connected to a cloud computing infrastructure. In some embodiments, the digital processing device can be optionally connected to an intranet. In some embodiments, the digital processing device can be optionally connected to a data storage device.

Non-limiting examples of digital processing devices that may be used include server computers, desktop computers, laptop computers, notebook computers, sub-notebook computers, netbook computers, netpad computers, set-top computers, handheld computers, Internet appliances, mobile smartphones, and tablet computers. Non-limiting examples of tablet computers can include, for example, tablet computers with booklet, slate, and/or convertible configurations.

In some embodiments, the digital processing device can include an operating system configured to perform executable instructions. For example, the operating system can include software, including programs and data, which manages the device's hardware and provides services for execution of applications. Non-limiting examples of operating systems include Ubuntu, FreeBSD, OpenBSD, NetBSD®, Linux, Apple® Mac OS X Server®, Oracle® Solaris®, Windows Server®, and Novell® NetWare®. Non-limiting examples of suitable personal computer operating systems include Microsoft® Windows®, Apple® Mac OS X®, UNIX®, and UNIX-like operating systems such as GNU/Linux®. In some embodiments, the operating system can be provided by cloud computing, and cloud computing resources can be provided by one or more service providers.

In some embodiments, the device may include a storage and/or memory device. The storage and/or memory device may be one or more physical apparatuses used to store data or programs on a temporary or permanent basis. In some embodiments, the device may be volatile memory and require power to maintain stored information. In some embodiments, the device may be non-volatile memory and retain stored information when the digital processing device is not powered. In some embodiments, the non-volatile memory may include flash memory. In some embodiments, the non-volatile memory may include dynamic random-access memory (DRAM). In some embodiments, the non-volatile memory may include ferroelectric random-access memory (FRAM). In some embodiments, the non-volatile memory may include phase-change random access memory (PRAM). In some embodiments, the device may be a storage device including, for example, CD-ROMs, DVDs, flash memory devices, magnetic disk drives, magnetic tapes drives, optical disk drives, and cloud computing-based storage. In some embodiments, the storage and/or memory device may be a combination of devices such as those disclosed herein.

In some embodiments, the digital processing device may include a display to send visual information to a user. In some embodiments, the display may be a cathode ray tube (CRT). In some embodiments, the display may be a liquid crystal display (LCD). In some embodiments, the display may be a thin film transistor liquid crystal display (TFT-LCD). In some embodiments, the display may be an organic light emitting diode (OLED) display. In some embodiments, on OLED display may be a passive-matrix OLED (PMOLED) or active-matrix OLED (AMOLED) display. In some embodiments, the display may be a plasma display. In some embodiments, the display may be a video projector. In some embodiments, the display may be a combination of devices such as those disclosed herein.

In some embodiments, the digital processing device may include an input device to receive information from a user. In some embodiments, the input device may be a keyboard. In some embodiments, the input device may be a pointing device including, for example, a mouse, trackball, track pad, joystick, game controller, or stylus. In some embodiments, the input device may be a touch screen or a multi-touch screen. In some embodiments, the input device may be a microphone to capture voice or other sound input. In some embodiments, the input device may be a video camera to capture motion or visual input. In some embodiments, the input device may be a combination of devices such as those disclosed herein.

D. Non-Transitory Computer-Readable Storage Medium

In some embodiments, the subject matter disclosed herein may include one or more non-transitory computer-readable storage media encoded with a program including instructions executable by the operating system of an optionally networked digital processing device. In some embodiments, a computer-readable storage medium may be a tangible component of a digital processing device. In some embodiments, a computer-readable storage medium may be optionally removable from a digital processing device. In some embodiments, a computer-readable storage medium may include, for example, CD-ROMs, DVDs, flash memory devices, solid state memory, magnetic disk drives, magnetic tape drives, optical disk drives, cloud computing systems and services, and the like. In some embodiments, the program and instructions may be permanently, substantially permanently, semi-permanently, or non-transitorily encoded on the media.

E. Computer Systems

The methods disclosed herein are conveniently implemented using a computer system or similar processing device ("computer system" hereafter). In different embodiments, software or machine-executable instructions for performing an algorithm can be loaded or otherwise held in a memory component of a freestanding computer system, or in a memory component of a computer system linked to a device used for monitoring. This includes a processing device component on an electronic circuit board (e.g., embedded software) of an automated nucleic acid analyzer.

In some embodiments, the computer system can be in communication with, either by wired or wireless means, a fluorometer that detects fluorescent signals, where the fluorometer is arranged or configured to monitor fluorescent signals generated in one or more reaction vessels contained within a temperature-controlled incubator. The incubator can be a temperature-controlled block (e.g., a metal block configured for receiving and containing one or more tubes, or even a multi-well plate), or a chamber that exposes one or more reaction vessels to controlled temperature conditions.

In some embodiments, a nucleic acid analyzer or other appropriate sequencing technology can be coupled to an appropriately programmed computer system which functions to instruct the operation of these instruments in accordance with preprogrammed or user input instructions. The computer system may receive data and information from these instruments, and interpret, manipulate and report this information to the user.

In some embodiments, the computer system also can include appropriate software for receiving user instructions, either in the form of user input into a set of parameter fields, or in the form of preprogrammed instructions (e.g., preprogrammed for a variety of different specific operations). The software then converts these instructions to appropriate language for instructing the operation of the nucleic acid analyzer to carry out the desired operation. The computer system also is capable of receiving data from one or more sensors/detectors included within the nucleic acid analyzer and interprets the data in accordance with the programming. The nucleic acid analyzer may include software that correlates a feature of a growth curve representing the quantity of amplified copies of the polynucleotide of interest as a function of time, as detected by the detector, to the number of copies of the polynucleotide of interest present in a test sample.

When the computer system used for executing the disclosed methods, the apparatus may comprise a temperature-controlled incubator, a detection device for collecting signals (e.g., a fluorometer), and an analyzing device (e.g., a computer system or processor) for analyzing signals. The apparatus optionally can further include an output device for displaying data obtained or generated. The analyzing device may be connected to the temperature-controlled incubator through an input device, and/or connected to an output device for data display. In one embodiment, the temperature-controlled incubator is capable of temperature cycling.

The present disclosure may provide computer systems that are programmed to implement methods of the disclosure. FIG. 1 shows a computer system 101 that is programmed or otherwise configured to store, process, identify, or data. The computer system 101 can process various aspects of data. The computer system 101 can be an electronic device of a user or a computer system that is remotely located with respect to the electronic device. The electronic device can be a mobile electronic device.

The computer system 101 includes a central processing unit (CPU, also "processor" and "computer processor" herein) 105, which can be a single core or multi core processor, or a plurality of processors for parallel processing. The computer system 101 also includes memory or memory location 110 (e.g., random-access memory, read-only memory, flash memory), electronic storage unit 115 (e.g., hard disk), communication interface 120 (e.g., network adapter) for communicating with one or more other systems, and peripheral devices 125, such as cache, other memory, data storage and/or electronic display adapters. The memory 110, storage unit 115, interface 120, and peripheral devices 125 are in communication with the CPU 105 through a communication bus (solid lines), such as a motherboard. The storage unit 115 can be a data storage unit (or data repository) for storing data. The computer system 101 can be operatively coupled to a computer network ("network") 130 with the aid of the communication interface 120. The network 130 can be the Internet, an internet and/or extranet, or an intranet and/or extranet that is in communication with the Internet. The network 130 in some embodiments is a telecommunication and/or data network. The network 130 can include one or more computer servers, which can enable distributed computing, such as cloud computing. The network 130, in some embodiments with the aid of the computer system 101, can implement a peer-to-peer network, which may enable devices coupled to the computer system 101 to behave as a client or a server.

The CPU 105 can execute a sequence of machine-readable instructions, which can be embodied in a program or software. The instructions may be stored in a memory location, such as the memory 110. The instructions can be directed to the CPU 105, which can subsequently program or otherwise configure the CPU 105 to implement methods of the present disclosure. Examples of operations performed by the CPU 105 can include fetch, decode, execute, and writeback.

The CPU 105 can be part of a circuit, such as an integrated circuit. One or more other components of the system 101 can be included in the circuit. In some embodiments, the circuit is an application specific integrated circuit (ASIC).

The storage unit 115 can store files, such as drivers, libraries, and saved programs. The storage unit 115 can store user data, e.g., user preferences and user programs. The computer system 101 in some embodiments can include one or more additional data storage units that are external to the computer system 101, such as located on a remote server that is in communication with the computer system 101 through an intranet or the Internet.

The computer system 101 can communicate with one or more remote computer systems through the network 130. For instance, the computer system 101 can communicate with a remote computer system of a user. Examples of remote computer systems include personal computers (e.g., portable PC), slate or tablet PCs (e.g., Apple® iPad, Samsung® Galaxy Tab), telephones, Smart phones (e.g., Apple® iphone, Android-enabled device, Blackberry®), or personal digital assistants. The user can access the computer system 101 via the network 130.

Methods as described herein can be implemented by way of machine (e.g., computer processor) executable code stored on an electronic storage location of the computer system 101, such as, for example, on the memory 110 or electronic storage unit 115. The machine executable or machine-readable code can be provided in the form of software. During use, the code can be executed by the processor 105. In some embodiments, the code can be retrieved from the storage unit 115 and stored on the memory 110 for ready access by the processor 105. In some embodiments, the electronic storage unit 115 can be precluded, and machine-executable instructions are stored on memory 110.

The code can be pre-compiled and configured for use with a machine having a processor adapted to execute the code or can be interpreted or compiled during runtime. The code can be supplied in a programming language that can be selected to enable the code to execute in a pre-compiled, interpreted, or as-compiled fashion.

Aspects of the systems and methods provided herein, such as the computer system 101, can be embodied in programming. Various aspects of the technology may be thought of as "products" or "articles of manufacture" in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as the main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD, or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 101 can include or be in communication with an electronic display 135 that comprises a user interface (UI) 140 for providing, for example, a genomic region. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 105.

In some embodiments, the subject matter disclosed herein can include at least one computer program or use of the same. A computer program can be a sequence of instructions, executable in the digital processing device's CPU, GPU, or TPU, written to perform a specified task. Computer-readable instructions can be implemented as program modules, such as functions, objects, Application Programming Interfaces (APIs), data structures, and the like, that perform particular tasks or implement particular abstract data types. A computer program can be written in various versions of various languages.

The functionality of the computer-readable instructions can be combined or distributed as desired in various environments. In some embodiments, a computer program can include one sequence of instructions. In some embodiments, a computer program can include a plurality of sequences of instructions. In some embodiments, a computer program can be provided from one location. In some embodiments, a computer program can be provided from a plurality of locations. In some embodiments, a computer program can include one or more software modules. In some embodiments, a computer program can include, in part or in whole, one or more web applications, one or more mobile applications, one or more standalone applications, one or more web browser plug-ins, extensions, add-ins or add-ons, or combinations thereof.

In some embodiments, computer processing can be a method of statistics, mathematics, biology, or any combination thereof. In some embodiments, the computer processing method includes a dimension reduction method including, for example, logistic regression, dimension reduction, principal component analysis, autoencoders, singular value decomposition, Fourier bases, singular value decomposition, wavelets, discriminant analysis, support vector machine, tree-based methods, random forest, gradient boost tree, logistic regression, matrix factorization, network clustering, and neural network.

In some embodiments, the computer processing method may be a supervised machine learning method including, for example, a regression, support vector machine, tree-based method, and network.

In some embodiments, the computer processing method may be an unsupervised machine learning method including, for example, clustering, network, principal component analysis, and matrix factorization.

G. Databases

In some embodiments, the subject matter disclosed herein can include one or more databases, or use of the same to store data. Various databases can be suitable for storage and retrieval of the sequence information. In some embodiments, suitable databases can include, for example, relational databases, non-relational databases, object-oriented databases, object databases, entity-relationship model databases, associative databases, and XML databases. In some embodiments, a database can be internet-based. In some embodiments, a database can be web-based. In some embodiments, a database can be cloud computing-based. In some embodiments, a database can be based on one or more local computer storage devices.

EXAMPLES

Example 1: Methods for Detection of Primary Diseases

The methods and systems described herein are used to detect a first primary disease, a second primary disease, one or more additional primary diseases, or a combination thereof.

As illustrated in FIGS. 3A and 3B, a first primary disease is determined in a subject. A first assay is developed to detect the first primary disease of the subject. The first assay is a personalized assay capable of determining MRD. A second assay is developed to detect one or more other primary diseases (i.e., second primary disease). The second assay is developed without personalization to the subject. A biological sample of the subject is collected. The biological sample may be a blood sample of the subject. The first assay that is personalized and the second assay that is not personalized are applied to the biological sample of the subject. Both assays (the first assay and the second assay) are applied to the same biological sample in a combined workflow.

In some cases, a signal is identified in the first assay and the second assay. In some cases, the signal identified in the first assay is consistent with a first primary disease. An assessment of whether the signal identified in the second assay is consistent with the signal identified in the first assay is conducted. If the signal identified in the second assay signal is consistent with the signal identified in the first assay, it is determined that the subject has the first primary disease only. For example, in some embodiments, a subject may have a recurrence, or remnant, of a first primary disease that the first assay is not sensitive enough to detect, however the second assay is sensitive enough to detect, thereby having consistent signals between the first and second assays. As another example, in some embodiments, a subject may have developed a second type of the same disease as the first primary disease, thereby having consistent signals between the first and second assays. If the signal identified in the second assay is not consistent with the signal identified in the first assay, it is determined that the subject has the first primary disease and a second primary disease.

In some cases, a signal is identified in the second assay, but a signal is not identified in the first assay. An assessment of whether the signal identified in the second assay is consistent with the first primary disease is conducted. If the signal identified in the second assay signal is consistent with the first primary disease, it is determined that the subject has the first primary disease only. For example, in some embodiments, a subject may have a recurrence, or remnant, of a first primary disease that the first assay is not sensitive enough to detect, however the second assay is sensitive enough to detect, thereby having consistent signals between the first and second assays. As another example, in some embodiments, a subject may have developed a second type of the same disease as the first primary disease, thereby having consistent signals between the first and second assays. If the signal identified in the second assay is not consistent with the first primary disease, it is determined that the subject has the second primary disease only.

In some cases, a signal is identified in the first assay but not in the second assay. In this case, it is determined that the subject comprises the first primary disease only.

In some cases, a signal is not identified in either the first assay or the second assay. In this case, the subject is identified has not having the first primary disease nor the second primary disease.

In some cases, the second assay analyzes whether one or more additional primary diseases are present in the subject.

As such, the methods and systems herein are used to detect a first primary disease, a second primary disease, one or more additional primary diseases, or a combination thereof, in a subject.

Example 2: Method for Detection of a Primary Disease Using Different Assays

The methods and systems described herein are used to detect a first primary disease, a second primary disease, one or more additional primary diseases, or a combination thereof.

As illustrated in FIGS. 3A and 3B, a first primary disease is determined in a subject. A first assay is developed to detect the first primary disease of the subject. The first assay is a tumor informed assay capable of determining MRD. A second assay is developed to detect one or more primary diseases. A first biological sample of the subject is collected. The first assay is applied to the biological sample, and the second assay is applied to the biological sample in a combined workflow. The first assay may look at genetic biomarkers and the second assay may look at epigenetic biomarkers.

In some cases, a signal is identified in the first assay and the second assay. In some cases, the signal identified in the first assay is consistent with a first primary disease. An assessment of whether the signal identified in the second assay is consistent with the signal identified in the first assay is conducted. If the signal identified in the second assay signal is consistent with the signal identified in the first assay, it is determined that the subject has the first primary disease only. If the signal identified in the second assay is not consistent with the signal identified in the first assay, it is determined that the subject has the first primary disease and a second primary disease.

In some cases, a signal is identified in the second assay and not the first assay. An assessment of whether the signal identified in the second assay is consistent with the first primary disease is conducted. If the signal identified in the second assay signal is consistent with the first primary disease, it is determined that the subject has the first primary disease only. If the signal identified in the second assay is not consistent with the first primary disease, it is determined that the subject has the second primary disease only.

In some cases, a signal is identified in the second assay, but a signal is not identified in the first assay. In this case, it is determined that the subject comprises the second primary disease only.

In some cases, the second assay analyzes whether one or more additional primary diseases are present in the subject.

As such, the methods and systems herein are used to detect a first primary disease, a second primary disease, one or more additional primary diseases, or a combination thereof, in a subject.

Example 3: Methods for Detection of a Primary Disease Using the Same Assay

The methods and systems described herein are used to detect a first primary disease, a second primary disease, one or more additional primary diseases, or a combination thereof.

As illustrated in FIGS. 3A and 3B, a first primary disease is determined in a subject. A first assay is developed to detect the first primary disease of the subject. A second assay is developed to detect one or more other primary diseases (i.e., second primary disease). The second assay may be the same assay as the first assay. A biological sample of the subject is collected. The first assay and the second assay are applied to the biological sample in a combined workflow. The first assay and the second assay are the same assay. In such cases, the each of the first assay and the second assay are searching for different signals in the biological sample (e.g., first assay is looking for genetic biomarkers, like detection of SNPs, and the second assay is looking for epigenetic biomarkers, like methylation).

In some cases, a signal is identified in the first assay and the second assay. In some cases, the signal identified in the first assay is consistent with a first primary disease. An assessment of whether the signal identified in the second assay is consistent with the signal identified in the first assay is conducted. If the signal identified in the second assay signal is consistent with the signal identified in the first assay, it is determined that the subject has the first primary disease only. If the signal identified in the second assay is not consistent with the signal identified in the first assay, it is determined that the subject has the first primary disease and a second primary disease.

In some cases, a signal is identified in the second assay and not the first assay. An assessment of whether the signal identified in the second assay is consistent with the first primary disease is conducted. If the signal identified in the second assay signal is consistent with the first primary disease, it is determined that the subject has the first primary disease only. If the signal identified in the second assay is not consistent with the first primary disease, it is determined that the subject has the second primary disease only.

In some cases, a signal is identified in the second assay, but a signal is not identified in the first assay. In this case, it is determined that the subject comprises the second primary disease only.

In some cases, the second assay analyzes whether one or more additional primary diseases are present in the subject.

As such, the methods and systems herein are used to detect a first primary disease, a second primary disease, one or more additional primary diseases, or a combination thereof, in a subject.

Example 4: Methods for Detection of a Primary Disease Using One Assay

The methods and systems described herein are used to detect a first primary disease, a second primary disease, one or more additional primary diseases, or a combination thereof.

As illustrated in FIGS. 3A and 3B, a first primary disease is determined in a subject. An assay is developed to detect the presence or absence of a first primary disease (e.g., MRD assay), and a potential second primary disease of the subject. A biological sample of the subject is collected. The first assay and the second assay are applied to the biological sample in a combined workflow. In such cases, the first assay (as described herein) and the second assay (as described herein) are the same assay, but the resulting signals (data) of the assay are analyzed in different ways. For example, the first analysis may be a genetic-based analysis and is associated with the first assay as described herein, and the second analysis may be an epigenetic-based analysis and is associated with the second assay as described herein.

The assay is analyzed in two or more different ways. The first analysis may be referred to as an analysis of the first assay herein. The second analysis may be referred to as an analysis of the second assay herein. A first analysis is applied to the data collected from the assay which interprets genetic data. A second analysis is applied to the data collected from the assay which interprets epigenetic data. The first analysis may determine the presence or absence of the first primary disease and the second analysis may determine the presence or absence of the second primary disease.

In some cases, a signal is identified in the first assay and the second assay. In some cases, the signal identified in the first assay is consistent with a first primary disease. An assessment of whether the signal identified in the second assay is consistent with the signal identified in the first assay is conducted. If the signal identified in the second assay signal is consistent with the signal identified in the first assay, it is determined that the subject has the first primary disease only. If the signal identified in the second assay is not consistent with the signal identified in the first assay, it is determined that the subject has the first primary disease and a second primary disease.

In some cases, a signal is identified in the second assay and not the first assay. An assessment of whether the signal identified in the second assay is consistent with the first primary disease is conducted. If the signal identified in the second assay signal is consistent with the first primary disease, it is determined that the subject has the first primary disease only. If the signal identified in the second assay is not consistent with the first primary disease, it is determined that the subject has the second primary disease only.

In some cases, a signal is identified in the second assay, but a signal is not identified in the first assay. In this case, it is determined that the subject comprises the second primary disease only.

In some cases, the second assay analyzes whether one or more additional primary diseases are present in the subject.

As such, the methods and systems herein are used to detect a first primary disease, a second primary disease, one or more additional primary diseases, or a combination thereof, in a subject.

Example 5: Detecting Second Primary Disease Using Digital Signature Assay

Whole Genome Sequence is performed on a subject's tumor, and a digital signature of the subject's tumor is generated. WGS is performed on the subject's cfDNA sample.

The workflow comprises WGS on the subject's cfDNA and the resulting data is analyzed in two separate ways (e.g., two separate assays).

The cfDNA is analyzed once in a tumor-informed manner using the genetic biomarkers that are part of the digital signature. This may help determine the presence or absence of first primary disease (e.g., MRD of first primary disease).

The cfDNA is analyzed in a second, tumor-naïve manner using fragmentomics patterns. The fragmentomics patterns may help determine the presence or absence of a second primary disease (e.g., cancer) in the subject.

Other tumor-naïve epigenetic biomarkers may be assessed in a similar manner to determine presence of second primary disease, for example, methylation patterns.

Example 6: Detecting Second Primary Disease Using Personalized Sequencing Assay

Whole Genome Sequencing is performed on a subject's tumor. A personalized panel of a select quantity target variants is determined and developed. Targeted sequencing on the subject's cfDNA sample is performed based on the target variants (or target loci) identified in the personalized panel. This may be the first assay of a workflow.

In addition to targeting the identified variants of the personalized panel, other areas of the genome are targeted that may help determine the presence of a second primary disease. Regions of the genome that are commonly overmethylated or under-methylated and are associated with cancers can be targeted. This may be the second assay of a workflow.

The cfDNA is sequenced based on the target genetic variants (e.g., personalized panel) and the epigenetic variants (e.g., methylated regions) in a combined workflow to determine the presence or absence of the first primary disease and the presence or absence of the second primary disease.

While certain examples of methods and systems have been shown and disclosed herein, one of skill in the art will realize that these are provided by way of example only and not intended to be limiting within the specification. Numerous variations, changes, and substitutions will now occur to those skilled in the art without departing from the scope disclosed herein. Furthermore, it shall be understood that all aspects of the disclosed methods and systems are not limited to the specific depictions, configurations or relative proportions set forth herein which depend upon a variety of conditions and variables and the description is intended to include such alternatives, modifications, variations or equivalents.

What is claimed is:

1. A method comprising:
   (a) performing a first assay on a biological sample obtained or derived from a subject, wherein the first assay comprises a minimum residual disease (MRD) assay, wherein the subject has been previously diagnosed with a first cancer,
      wherein the MRD assay comprises a genetic sequencing assay or a polymerase chain reaction (PCR) assay,
      wherein the MRD assay determines a presence or an absence of the first cancer based at least in part on detecting a first signal comprising a plurality of personalized genetic variations previously identified in the first cancer of the subject;
   (b) performing a second assay comprising an epigenetic assay, wherein the epigenetic assay comprises one or more of: a methylation assay, a proteomic assay, or a fragmentomics assay,
      wherein the second assay detects a second signal comprising an epigenetic signal of the biological sample obtained or derived from the subject, wherein the epigenetic signal is not personalized to the subject;
   (c) determining a presence or an absence of a second cancer of the subject based at least in part on comparing one or more epigenetic variations of the second signal of (b) to a plurality of reference epigenetic variations,
      wherein the plurality of reference epigenetic variations comprises one or more epigenetic variations associated with the previously identified first cancer,
      wherein the presence of the second cancer is indicated when the comparing identifies a difference between the detected one or more epigenetic variations of the second signal and the reference epigenetic variations associated with the previously identified first cancer,
      wherein the second cancer is different from the first cancer,
      wherein the first cancer or the second cancer comprise one or more of: adrenal gland cancer, kidney cancer, aerodigestive tract cancer, biliary tract cancer, breast cancer, liver cancer, ovarian cancer, lung cancer, leukemia, lymphoma, salivary gland cancer, renal cancer, bladder cancer, brain cancer, head and neck cancer, prostate cancer, skin cancer, pancreatic cancer, cervical cancer, colorectal cancer, testicular cancer, thyroid cancer, bile duct cancer, central nervous system cancer, or esophageal cancer, or any combination thereof;
   (d) determining a presence of the first cancer based on the MRD assay of (a) or a presence of the second cancer based on the determining of (c); and (e) responsive to determining the presence of the first or second cancer, administering to the subject a treatment capable of treating the first or second cancer, wherein the treatment comprises a chemotherapy, a radiation therapy, a surgical resection of the first or second cancer, a targeted cancer therapy, or a cancer immunotherapy.

2. The method of claim 1, wherein the MRD assay comprises a personalized genetic sequencing assay, and wherein the second assay comprises an epigenetic digital signature assay.

3. The method of claim 2, wherein the MRD assay comprises a tumor-informed genetic assay.

4. The method of claim 2, wherein the second assay comprises a tumor-naïve epigenetic assay.

5. The method of claim 2, wherein the second assay comprises methylation sequencing.

6. The method of claim 5, wherein the methylation sequencing comprises enzymatic methyl sequencing (EM-Seq), nanopore sequencing, bisulfite sequencing, or a methylation enrichment assay.

7. The method of claim 2, wherein the second assay comprises a fragmentation assay.

8. The method of claim 1, wherein the method further comprises performing a first analysis of the first signal of the MRD assay and performing a second analysis of the second signal of the second assay to generate a first data comprising the genetic variant signal obtained or derived from the MRD assay and second data comprising the epigenetic information obtained or derived from the second assay, wherein the first data and the second data are different.

9. The method of claim 8, wherein the first signal comprises the genetic variant signal.

10. The method of claim 8, wherein the second assay comprises a methylation sequencing assay or a fragmentation assay.

11. The method of claim 1, wherein the method further comprises performing a first analysis using the first signal of the MRD assay, and performing a second analysis using the second signal of the second assay, and wherein the first signal and the second signal originate from different features or different measurements of the same genetic or epigenetic data.

12. The method of claim 11, wherein the same genetic data comprises whole genome sequencing data.

13. The method of claim 12, wherein the first signal comprises a genetic variant signal.

14. The method of claim 13, wherein the genetic variant signal comprises a single nucleotide variant (SNV) signal.

15. The method of claim 12, wherein the second signal comprises an epigenetic signal.

16. The method of claim 15, wherein the epigenetic signal comprises a deoxyribonucleic acid (DNA) methylation signal or a fragmentation signal.

17. The method of claim 1, wherein the subject has not been diagnosed with the second cancer.

18. The method of claim 17, wherein the subject is asymptomatic of the second cancer.

19. The method of claim 17, wherein the subject is symptomatic of the second cancer.

20. The method of claim 1, wherein the presence of the second cancer of the subject is detected with a sensitivity of at least 50%.

21. The method of claim 1, wherein the absence of the second cancer of the subject is detected with a specificity of at least 50%.

22. The method of claim 1, wherein the biological sample comprises a blood sample, a plasma sample, or a serum sample.

23. The method of claim 22, wherein the biological sample comprises cell-free deoxyribonucleic acid (cfDNA), cell-free ribonucleic acid (cfRNA), circulating tumor cells (CTCs), or a combination thereof.

24. The method of claim 1, wherein a time between a suspicion of the second cancer and a diagnosis of the second cancer is reduced by at least 10% relative to a method comprising additional testing, additional imaging, or a combination thereof prior to the diagnosis of the second cancer.

25. The method of claim 1, further comprising utilizing the second assay to confirm the presence of the first cancer, wherein at least a subset of the detected one or more epigenetic variations of the epigenetic signal are the same as the plurality of epigenetic variations associated with the previously identified first cancer.

26. The method of claim 1, wherein the MRD assay comprises both the genetic sequencing assay and the PCR assay.

27. The method of claim 1, wherein administering the treatment comprises generating a treatment plan responsive to the determined presence of the first cancer of (a) and the determined presence or absence of the second cancer of (d).

28. The method of claim 1, wherein administering the treatment comprises modifying a treatment plan to be responsive to the determined presence of the first cancer of (a) and the determined presence or absence of the second cancer of (d).

29. The method of claim 1, wherein the first assay and the second assay are performed subsequently as part of a same workflow.

30. The method of claim 1, wherein the first assay and the second assay are performed simultaneously as part of a same workflow.

* * * * *